(12) United States Patent
Park

(10) Patent No.: US 9,728,118 B2
(45) Date of Patent: Aug. 8, 2017

(54) DC-DC CONVERTER AND DISPLAY DEVICE HAVING THE SAME

(71) Applicant: SAMSUNG DISPLAY CO., LTD., Yongin, Gyeonggi-do (KR)

(72) Inventor: Sung-Chun Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 173 days.

(21) Appl. No.: 14/694,997

(22) Filed: Apr. 23, 2015

(65) Prior Publication Data

US 2016/0125791 A1 May 5, 2016

(30) Foreign Application Priority Data

Oct. 31, 2014 (KR) .................. 10-2014-0149698

(51) Int. Cl.
*G09G 3/32* (2016.01)
*G09G 3/20* (2006.01)
(Continued)

(52) U.S. Cl.
CPC ......... *G09G 3/2096* (2013.01); *G09G 3/3208* (2013.01); *H02M 3/1584* (2013.01); *G09G 2330/023* (2013.01)

(58) Field of Classification Search
CPC ............ G09G 3/2096; G09G 3/3208; G09G 2330/023; H02M 3/1584
(Continued)

(56) References Cited

U.S. PATENT DOCUMENTS 8,072,200 B1* 12/2011 Qiu .................. G01R 19/0092
323/282
2004/0218319 A1* 11/2004 Sae-Ueng ............... H02M 1/36
361/18
(Continued)

FOREIGN PATENT DOCUMENTS

EP 2 639 784 A2 9/2013
KR 10-2013-0025057 A 3/2013
(Continued)

OTHER PUBLICATIONS

EPO Search Report dated Apr. 29, 2016, for corresponding European Patent application 15170938.3, (9 pages).

*Primary Examiner* — Andrew Sasinowski
*Assistant Examiner* — Chineyere Wills-Burns
(74) *Attorney, Agent, or Firm* — Lewis Roca Rothgerber Christie LLP

(57) ABSTRACT

A DC-DC converter for supplying a display panel with first and second power voltages, the DC-DC converter includes: a first converting module to convert an input power voltage into the first power voltage in response to a control signal; a sensor to detect a drive current of the display panel when the first power voltage is output; and a second converting module to convert the input power voltage into the second power voltage lower than the first power voltage in response to the control signal, the second converting module including: a first inverting converter to generate the second power voltage corresponding to the input power voltage regardless of an amount of the detected drive current; and a second inverting converter to selectively generate the second power voltage corresponding to the input power voltage and according to the amount of the detected drive current.

16 Claims, 16 Drawing Sheets

(51) Int. Cl.
*G09G 3/3208* (2016.01)
*H02M 3/158* (2006.01)

(58) Field of Classification Search
USPC .......................................................... 345/211
See application file for complete search history.

(56) References Cited

U.S. PATENT DOCUMENTS

| | | | | |
|---|---|---|---|---|
| 2011/0089923 | A1* | 4/2011 | Cai ....................... | H02M 3/156 323/284 |
| 2012/0153907 | A1 | 6/2012 | Carobolante et al. | |
| 2012/0176105 | A1* | 7/2012 | Chang ................. | H02M 3/1584 323/237 |
| 2012/0224401 | A1* | 9/2012 | Phadke ............... | H02M 3/1584 363/84 |
| 2012/0293562 | A1* | 11/2012 | Park ..................... | G09G 3/3233 345/690 |
| 2013/0002639 | A1* | 1/2013 | Park ..................... | G09G 3/3225 345/212 |
| 2013/0057530 | A1 | 3/2013 | Han et al. | |
| 2013/0093407 | A1* | 4/2013 | Heo ...................... | H02M 3/156 323/290 |
| 2013/0113773 | A1 | 5/2013 | Lee et al. | |
| 2013/0235017 | A1* | 9/2013 | Park ..................... | G09G 3/3208 345/212 |
| 2013/0241808 | A1* | 9/2013 | Kwon .................. | H02M 3/158 345/76 |

FOREIGN PATENT DOCUMENTS

| | | |
|---|---|---|
| KR | 10-2013-0039510 A | 4/2013 |
| KR | 10-2013-0049049 A | 5/2013 |
| WO | WO 02/071591 A2 | 9/2002 |
| WO | WO 2004/109900 A1 | 12/2004 |

\* cited by examiner

DC-DC CONVERTER AND DISPLAY DEVICE HAVING THE SAME

CROSS REFERENCE TO RELATED APPLICATION

This application claims priority to and the benefit of Korean Patent Applications No. 10-2014-0149698, filed on Oct. 31, 2014 in the Korean Intellectual Property Office (KIPO), the disclosure of which is hereby incorporated by reference herein in its entirety.

BACKGROUND

1. Field

Aspects of some example embodiments of the inventive concept relate to display devices. More particularly, aspects of some example embodiments of the inventive concept relate to DC-DC converters and display devices having the DC-DC converter.

2. Discussion of the Related Art

In general, a display device includes a display panel having a plurality of pixels arranged in a matrix form. Each of the pixels operates in response to a driving voltage. For example, each of the plurality of pixels included in an organic light emitting display may have an organic light emitting diode (OLED). The OLED generates light by coupling holes, which are provided from an anode to which a first power voltage (ELVDD) is applied, and electrons, which are provided from a cathode to which a second power voltage (ELVSS) is applied, in an organic material layer formed between the anode and the cathode.

The display device includes a DC-DC converter. The DC-DC converter changes an input power voltage to one or more power voltages used for driving the pixels. For example, a DC-DC converter may supply a high power voltage (the first power voltage) and a low power voltage (the second power voltage) to the pixels through power source lines. The range of drive current flowing through a display panel may increase as the size of the display panel increases. Therefore, conversion efficiency of the DC-DC converter with respect to the whole range of the drive current may decrease when the DC-DC converter is designed for large drive current. Additionally, conduction loss may increase as a result of relatively large internal resistance of the DC-DC converter. Conduction loss decreases conversion efficiency of the DC-DC converter and increases heat generated by the DC-DC converter.

The above information disclosed in this Background section is only for enhancement of understanding of the background of the present invention, and therefore, it may contain information that does not form prior art.

SUMMARY

Some aspects of example embodiments provide a DC-DC converter controlled by an amount of driving current.

Some aspects of example embodiments provide a display device including the DC-DC converter.

Some aspects of example embodiments provide a method of driving the display device.

According to example embodiments, a DC-DC converter to supply a display panel with first and second power voltages includes: a first converting module configured to convert an input power voltage into the first power voltage in response to a control signal, and to output the first power voltage to a first output terminal; a sensor configured to detect a drive current of the display panel when the first power voltage is output; and a second converting module configured to convert the input power voltage into the second power voltage that is lower than the first power voltage in response to the control signal, and to output the second power voltage to a second output terminal, the second converting module including: a first inverting converter configured to generate the second power voltage corresponding to the input power voltage regardless of an amount of the detected drive current; and a second inverting converter configured to selectively generate the second power voltage corresponding to the input power voltage and according to the amount of the detected drive current.

In example embodiments, the second converting module may further include: a drive controller configured to compare the drive current with a reference current to generate a driving control signal for controlling an operation of the second inverting converter, and to output the driving control signal to the second inverting converter.

In example embodiments, the drive controller may be configured to enable the driving control signal when the drive current is greater than the predetermined reference current.

In example embodiments, the second inverting converter may be configured to convert the input power voltage into the second power voltage while the driving control signal is enabled.

In example embodiments, the second converting module may further include: a pulse width modulation (PWM) controller configured to generate a control voltage based on a voltage difference between a feedback voltage generated based on the second power voltage and a reference voltage, and to generate a PWM signal based on the control voltage.

In example embodiments, the PWM controller may include: a voltage divider connected to one of the first and second inverting converters, and configured to generate the feedback voltage by dividing the second power voltage; an amplifier configured to output the control voltage by amplifying the voltage difference; a first PWM signal generator configured to generate the PWM signal based on the control voltage, and to output the PWM signal to the first inverting converter; and a second PWM signal generator configured to generate the PWM signal based on the control voltage, and to output the PWM signal to the second inverting converter.

In example embodiments, the first inverting converter may include: a first switch circuit including: a first switch transistor coupled between an input terminal configured to receive the input power voltage and a first node; a second switch transistor coupled between the first node and the second output terminal; and a first inductor coupled between the first node and a ground, wherein the first and second switch transistors are configured to be alternately turned on to convert the input power voltage to the second power voltage; and a first switch controller configured to receive the PWM signal from the PWM controller, and to control an on/off operation of the first and second switch transistors based on the PWM signal.

In example embodiments, the second inverting converter may include: a second switch circuit including: a third switch transistor coupled between the input terminal configured to receive the input power voltage and a second node; a fourth switch transistor coupled between the second node and the second output terminal; and a second inductor coupled between the second node and a ground, wherein the third and fourth switch transistors are configured to be alternately turned on to convert the input power voltage to the second power voltage; and a second switch controller configured to receive the PWM signal from the PWM controller, to receive the driving control signal from the drive controller, and to control the on/off operation of the first and second switch transistors based on the PWM signal and the driving control signal.

In example embodiments, aspect ratios of the first through fourth switch transistors may be substantially the same, and an inductance of the first inductor may be substantially the same as an inductance of the second inductor.

In example embodiments, aspect ratios of the first and second switch transistors may be less than aspect ratios of the third and fourth switch transistors, and an inductance of the first inductor may be less than an inductance of the second inductor.

In example embodiments, a period during which the first inverting converter generates the second power voltage may include a start-up period and a valid image period, and the second inverting converter may be configured to generate the second power voltage during the start-up period.

In example embodiments, the second converting module may further include: a drive controller configured to enable a driving control signal for controlling an operation of the second inverting converter during the start-up period, and to enable the driving control signal when the drive current is greater than a reference current during the valid image period.

In example embodiments, the display panel may be configured to receive display data representing a black color image during the start-up period, and the display panel may be configured to receive the display data representing a valid image during the valid image period.

In example embodiments, the sensor may be connected between the first converting module and the first output terminal, and the sensor may be configured to output a detected voltage by detecting the drive current.

In example embodiments, the second converting module may further include: a drive controller configured to compare the detected voltage with a reference voltage to generate a driving control signal for controlling an operation of the second inverting converter, and to enable the driving control signal when the detected voltage is greater than the reference voltage.

According to example embodiments, a display device may include: a display panel including a plurality of pixels, each of the pixels being configured to receive a first power voltage, a second power voltage lower than the first power voltage, and a data signal to display an image; a DC-DC converter configured to supply the display panel with the first and second power voltages in response to a control signal, and to detect a drive current applied to the display panel, the DC-DC converter including a plurality of inverting converters configured to generate the second power voltage, and the DC-DC converter further configured to activate a first inverting converter from among the inverting converters regardless of an amount of the detected drive current, and to selectively activate a second inverting converter from among the inverting converters according to the amount of the drive current; and a display panel driver configured to provide the data signal to the display panel, and to provide the control signal to the DC-DC converter.

In example embodiments, a period in which the DC-DC converter generates the second power voltage may include a start-up period and a valid image period, and the start-up period may correspond to N frame cycles, where N is a positive integer.

In example embodiments, the display panel driver may be configured to provide the data signal representing a black color image to the display panel during the start-up period, and to provide the data signal representing a valid image during the valid image period.

In example embodiments, the DC-DC converter may further include: a first converting module configured to convert an input power voltage into the first power voltage in response to the control signal, and to output the first power voltage to a first output terminal; a sensor configured to detect the drive current when the first power voltage is output; and a second converting module configured to convert the input power voltage into the second power voltage in response to the control signal, and to output the second power voltage to a second output terminal. The second converting module may include: the first inverting converter configured to generate the second power voltage based on the input power voltage regardless of the amount of the detected drive current; the second inverting converter configured to generate the second power voltage based on the input power voltage according to the amount of the detected drive current; and a drive controller configured to compare the drive current with a reference current to generate a driving control signal for controlling an operation of the second inverting converter, and to output the driving control signal to the second inverting converter.

In example embodiments, the second inverting converter may be configured to generate the second power voltage based on the driving control signal when the drive current is greater than the reference current.

Therefore, the DC-DC converter according to example embodiments may be configured to control the inverting converters that generate the second power voltage according to the amount of drive current, so that conduction loss and power consumption may be reduced and conversion efficiency of the power voltage may be improved. In detail, the DC-DC converter may drive the first inverting converter having small internal resistance (e.g., having small current capability) to generate the second power voltage when the drive current is less than or equal to the reference current. The DC-DC converter may distribute the drive current to the plurality of inverting converters to generate the second power voltage when the drive current is greater than the reference current, such that the inverting converters may respectively generate the second power voltage. Thus, power consumption with the conduction loss may be reduced, and conversion efficiency of the power voltage may be improved. As a result, the DC-DC converter 100 may be effectively applied to medium and large size display panels having wide drive current ranges.

In addition, the display device including the DC-DC converter may effectively output the second power voltage based on the amount of the drive current, such that a heat issue of the display device may be improved.

BRIEF DESCRIPTION OF THE DRAWINGS

The above and other aspects and features of the present invention will become apparent to those skilled in the art from the following detailed description of the example embodiments with reference to the accompanying drawings, in which.

DETAILED DESCRIPTION

Figure 1:
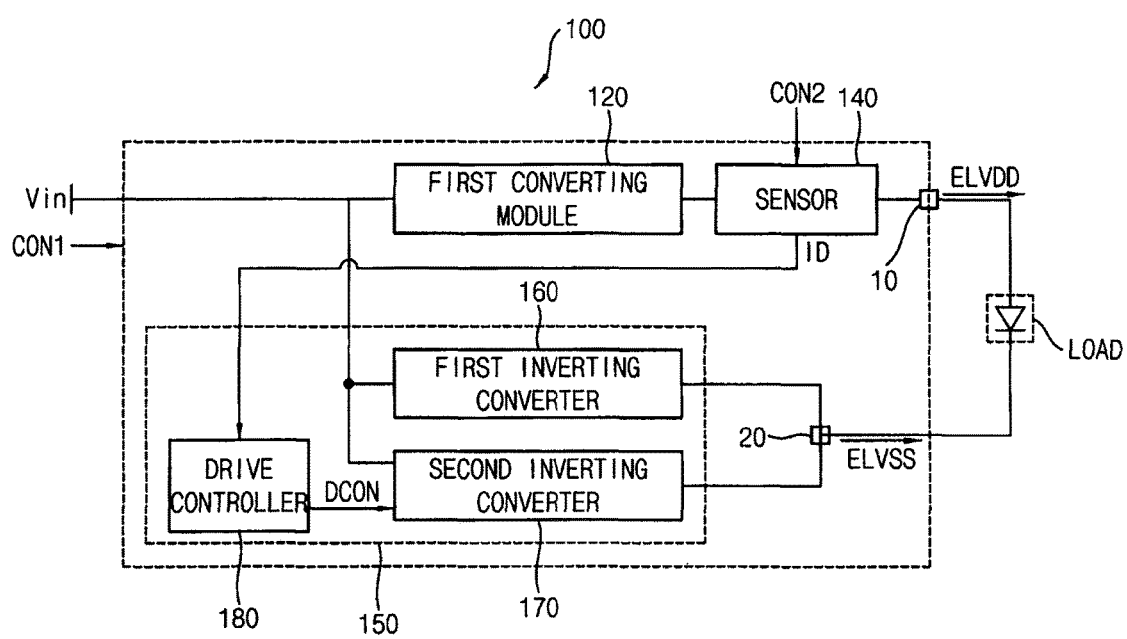
FIG. 1 is a block diagram of a DC-DC converter according to some example embodiments.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention are not described with respect to some of the embodiments of the present invention. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Exemplary embodiments will be described more fully hereinafter with reference to the accompanying drawings, in which various embodiments are shown.

FIG. 1 is a block diagram of a DC-DC converter according to some example embodiments.

Referring to FIG. 1, the DC-DC converter 100 includes a first converting module 120 (e.g., a first converter), a sensor 140, and a second converting module 150 (e.g., a second converter).

The first converting module 120 may convert an input power voltage Vin to a first power voltage ELVDD in response to a first control signal CON1, and may output the first power voltage ELVDD to a first output terminal 10. In some embodiments, the first converting module 120 may output the first power voltage ELVDD by boosting the input power voltage Vin using a boosting converter.

The sensor 140 may detect a drive current ID of a load LOAD (e.g., a display panel) when the first power voltage ELVDD is output to the load LOAD. The sensor 140 may be located between the first converting module 120 and the first output terminal 10 to detect the drive current ID. The sensor 140 may detect the drive current ID amount in response to a second control signal CON2 supplied from an external source. The detected drive current ID may be applied to a drive controller 180 included in the second converting module 150. In some embodiments, the sensor 140 may generate a detected voltage based on the drive current ID, and may apply the detected voltage to the drive controller 180. The sensor 140 may periodically detect the drive current ID during a first power voltage ELVDD output period.

In some embodiments, the load LOAD may refer to a load of a display panel connected to the DC-DC converter 100. The detected drive current ID may increase, as the load LOAD of the display panel increases.

The second converting module 150 may convert the input power voltage Vin into a second power voltage ELVSS lower than the first power voltage ELVDD in response to the first control signal CON1, and may output the second power voltage ELVSS to a second output terminal 20. In some embodiments, the second converting module 150 may output the second power voltage ELVSS by inverting the input power voltage Vin using a buck-boost converter.

The second converting module 150 includes a first inverting converter 160, and a second inverting converter 170. In one example embodiment, the first and second inverting converters 160 and 170 may include buck-boost converters. The second converting module 150 further includes the drive controller 180.

The first inverting converter 160 may generate the second power voltage ELVSS based on the input power voltage Vin, regardless of an amount of the detected drive current ID. The first inverting converter 160 may consistently or substantially consistently generate the second power voltage ELVSS, regardless of the amount of the detected drive current ID during a time when a valid image is displayed on the display panel.

The second inverting converter 170 may selectively generate the second power voltage ELVSS based on the input power voltage Vin according to the amount of the detected drive current ID. The second inverting converter 170 may be connected with the first inverting converter 160 in parallel. In some embodiments, the second converter 170 may operate when the drive current ID is greater than a reference current (e.g., a current tolerance of the first inverting converter 160). The drive current ID may be divided into a first current provided to the first inverting converter 160, and a second current provided to the second inverting converter 170. For example, the second inverting converter may not operate when the maximum allowable current of the first inverting converter 160 is about 500 mA and the drive current is equal to or less than 500 mA. However, the first and second inverting converters 160 and 170 may concurrently (e.g., simultaneously) generate the second power voltage ELVSS when the drive current ID is greater than 500 mA. The current tolerances (or a current capabilities) of the first and second inverting converters 160 and 170 may be lower than that of other inverting converters.

In some embodiments, the second inverting converter 170 may include a plurality of inverting converters. That is, a plurality of reference currents may be predetermined, such that at least one of the inverting converters corresponding to an amount of the drive current ID may operate (e.g., may generate the second power voltage ELVSS) when the drive current ID is greater than a specific reference current.

The drive controller 180 may compare the drive current ID with the reference current (e.g., predetermined reference current) to generate a driving control signal DCON for controlling the operation of the second inverting converter 170, and may output the driving control signal DCON to the second inverting converter 170. In some embodiments, the reference current may correspond to the current capability (or the current tolerance) of the first inverting converter 160. The current capability of the first inverting converter 160 (or a driving ability of the first inverting converter 160) may be proportional to an aspect ratio (e.g., W/L, a ratio of a channel length to a channel width) of switch transistors included in the first inverting converter 160. Further, inductance of an inductor included in the first inverting converter 160 may be determined by the aspect ratio. Here, the aspect ratio of the switch transistor may refer to a size of the switch transistor. Thus, the current capability of the first inverting converter 160 may increase, as the size of the switch transistor becomes larger.

The drive controller 180 may enable the driving control signal DCON when the drive current ID is greater than the reference current. The second inverting converter 170 may generate the second power voltage ELVSS when the driving control signal DCON is enabled.

As described above, the DC-DC converter 100 may drive the second inverting converter 170 when (e.g., only if or only when) the drive current ID is greater than the reference current. Thus, the first inverting converter 160 (e.g., only the first inverting converter from among the inverting converters) may operate (e.g., generates the second power voltage ELVSS) when the drive current ID is less than or equal to the reference current, so that conduction loss and heat generation according to the switch transistors and inductors in the inverting converters may decrease. Further, the size of the switch transistor and the inductor in the first inverting converter 160 may be smaller than other inverting converters known to those skilled in the art, so that conversion efficiency of the power voltage may be improved.

In addition, the first and second inverting converters 160 and 170 may generate the second power voltage ELVSS when the drive current ID is greater than the reference current, so that the drive current can be divided into a first current provided to the first inverting converter 160, and a second current provided to the second inverting converter 170. Thus, conduction loss and power consumption of the DC-DC converter 100 may decrease.

As a result, the DC-DC converter 100 may be effectively applied to medium and large size display panels having wide drive current ranges.

Figure 2:
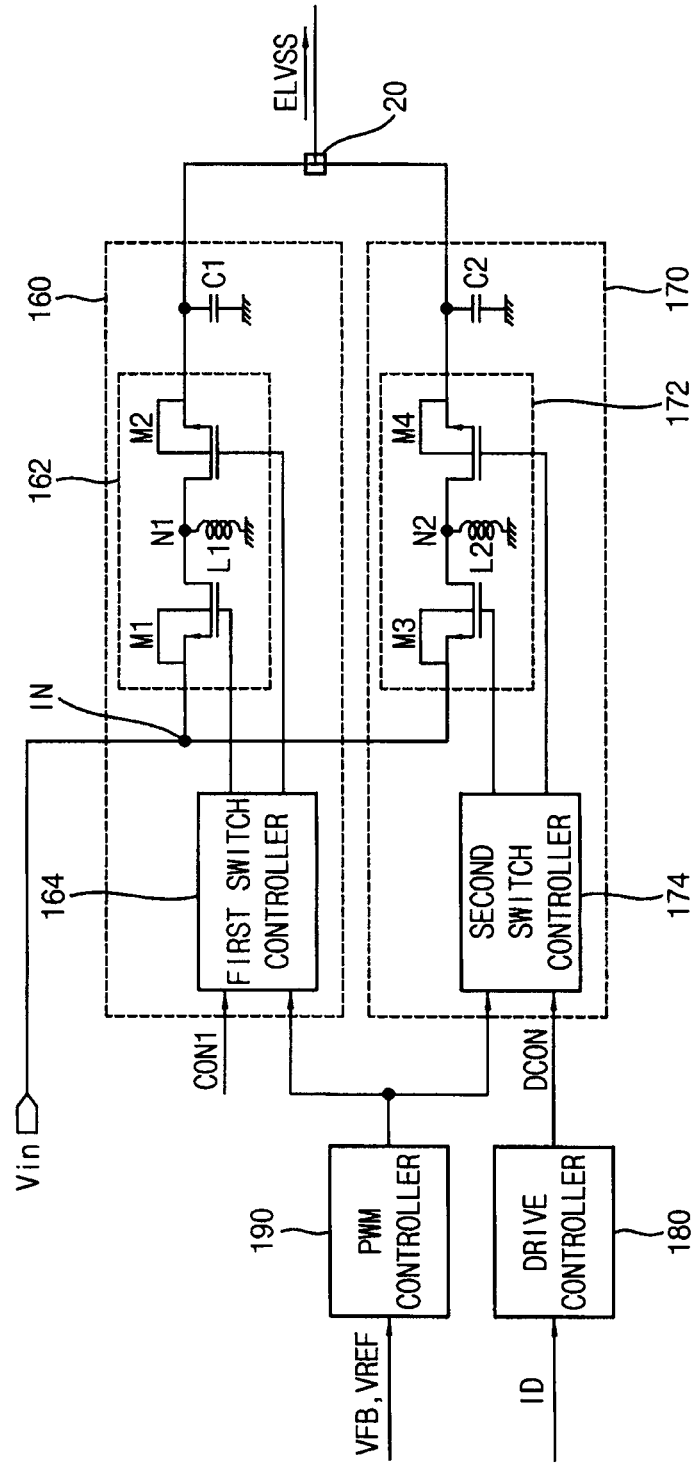
FIG. 2 is a block diagram illustrating an example of a second converting module included in the DC-DC converter shown in FIG. 1.

FIG. 2 is a block diagram illustrating an example of a second converting module included in the DC-DC converter shown in FIG. 1.

Referring to FIG. 2, the second converting module 150A includes a first inverting converter 160, a second inverting converter 170, a drive controller 180, and a pulse width modulation (PWM) controller 190.

The first inverting converter 160 may include a first switch part 162 (e.g., a first switch circuit) and a first switch controller 164.

The first switch part 162 may include a plurality of switch transistors and an inductor. The plurality of switch transistors may be alternately turned on to convert an input power voltage Vin to a second power voltage ELVSS.

In some embodiments, the first switch part 162 may include a first switch transistor M1, a second switch transistor M2, and a first inductor L1.

The first switch transistor M1 may be connected between an input terminal IN for receiving the input power voltage Vin and a first node N1. The first switch transistor M1 may be turned on in response to a control signal received from the first switch controller 164 to allow current to flow through the first inductor L1.

The second switch transistor M2 may be connected between the first node N1 and the second output terminal 20. The first switch transistor M1 and the second switch transistor M2 may be alternately turned on or off. After the first switch transistor M1 is turned on, and an electric motive force is generated by the first inductor L1, the second switch transistor M2 is turned on to convert the input power voltage Vin into the second power voltage ELVSS. The first inductor L1 may be arranged (e.g., connected) between the first node N1 and a ground. The second power voltage ELVSS is output to the second output terminal 20. In some embodiments, the second switch transistor M2 may be a freewheeling diode. In some embodiments, the first and second switch transistors M1 and M2 may have different channel types from each other.

Here, the first node N1 is a common node of the first and second switch transistors M1 and M2 and the first inductor L1.

Inductance of the first inductor L1 and a current capability (or a driving ability) of the first inverting converter 160 may be determined by sizes of the first and second switch transistors M1 and M2 (e.g., aspect ratios of the first and second switch transistors M1 and M2). The current capability of the first inverting converter 160 may decrease, as the sizes of the first and second switch transistors M1 and M2 become smaller.

The first switch controller 164 may receive a PWM signal from the PWM controller 190, and may control the on-off operations of the first and second switch transistors M1 and M2 based on the PWM signal. The first switch controller 164 may control the first and second switch transistors M1 and M2 so that the phases of the PWM signals for controlling the respective first and second switch transistors M1 and M2 are opposite to each other. In this case, the first and second switch transistors M1 and M2 are alternately turned on/off. In some embodiments, the first switch controller 164 may receive the first control signal CON1 from the external source, such as a timing controller. The first switch controller 164 may operate while the first control signal CON1 is enabled. Thus, the first inverting converter 160 may receive the PWM signal, and may generate the second power voltage ELVSS during a period in which the first control signal CON1 is enabled.

The first inverting converter 160 may further include a first capacitor C1 between the second output terminal 20 and the ground. The first capacitor C1 may stabilize the output of the second power voltage ELVSS.

The second inverting converter 170 may include a second switch part 172 (e.g., a second switch circuit) and a second switch controller 174.

In some embodiments, the second switch part 172 may include a third switch transistor M3, a fourth switch transistor M4, and a second inductor L2.

The third switch transistor M3 may be connected between the input terminal IN and a second node N2. The third switch transistor M3 may be turned on in response to a control signal received from the second switch controller 174 to allow current to flow through the second inductor L2.

The fourth switch transistor M4 may be connected between the second node N2 and the second output terminal 20. The third switch transistor M3 and the fourth switch transistor M4 may be alternately turned on. After the third switch transistor M3 is turned on, and an electric motive force is generated by the second inductor L2, the fourth switch transistor M4 is turned on to convert the input power voltage Vin into the second power voltage ELVSS. The second inductor L2 may be arranged (e.g., connected) between the second node N2 and the ground. The second power voltage ELVSS is output to the second output terminal 20. In some embodiments, the fourth switch transistor M4 may be a freewheeling diode. In some embodiments, the third and fourth switch transistors M3 and M4 may have different channel types from each other.

Here, the second node N2 is a common node of the third and fourth switch transistors M3 and M4 and the second inductor L2.

The second switch controller 174 may receive the PWM signal from the PWM controller 190, and may receive a driving control signal DCON from the drive controller 180. The second switch controller 174 may control the on/off operations of the third and fourth switch transistors M3 and M4 based on the PWM signal and the driving control signal DCON. In some embodiments, the second switch controller 174 may operate while the driving control signal DCON is enabled, and the second switch controller 174 may be deactivated while the driving control signal DCON is disabled. Thus, the second inverting converter 170 may receive the PWM signal, and may generate the second power voltage ELVSS during a period in which the driving control signal DCON is enabled.

The second inverting converter 170 may further include a second capacitor C2 between the second output terminal 20 and the ground. The second capacitor C2 may stabilize the output of the second power voltage ELVSS.

In some embodiments, aspect ratios of the first through fourth switch transistors M1 through M4 may be substantially the same, and an inductance of the first inductor L1 may be substantially the same as an inductance of the second inductor L2. In other words, the current capabilities of the first and second inverting converters 160 and 170 may be substantially the same. For example, the first and second inverting converters 160 and 170 may respectively allow maximum about 500 mA currents to flow through the first and second inductors L1 and L2 when a maximum drive current of the device is about 1 A (1 amp). Thus, the design of the DC-DC converter 100 may be simplified.

In some embodiments, the aspect ratios of the first and second switch transistors M1 and M2 may be less than the aspect ratios of the third and fourth switch transistors M3 and M4, and the inductance of the first inductor L1 may be less than the inductance of the second inductor L2. In other words, the current capability of the first inverting converter 160 may be less than the current capability of the second inverting converter 170. For example, the current capability ratio of the first inverting converter 160 to the second inverting converter may correspond to about 3:7 by designing the sizes of the first through fourth transistors M1 through M4 and the first and second inductors 1:1 and L2. In this case, the first inverting converter 160 may allow maximum about 300 mA current to flow through the first inductor L1, and the second inverting converter 170 may allow maximum about 700 mA current to flow through the second inductor L2, when the maximum drive current of the device is about 1 A.

The drive controller 180 may compare the drive current ID with the reference current (e.g., predetermined reference current) to generate the driving control signal DCON for controlling an operation of the second inverting converter 170, and may output the driving control signal DCON to the second inverting converter 170. In some embodiments, the reference current may correspond to the maximum allowable current (or the current capability) of the first inverting converter 160. The drive controller 180 may enable the driving control signal DCON when the drive current ID is greater than the reference current. The second inverting converter 160 may convert the input power voltage Vin into the second power voltage ELVSS while the driving control signal DCON is enabled.

The PWM controller 190 may generate a control voltage based on a voltage difference between a feedback voltage VFB generated based on the second power voltage ELVSS and a reference voltage VREF (e.g., a predetermined reference voltage), and may generate a PWM signal based on the control voltage. The PWM signal may be applied to the first and second switch controllers 164 and 174.

The PWM controller 190 may generate the PWM signal having a specific frequency according to the voltage difference for adjusting frequencies of the first and second switch parts 162 and 172. For example, if the feedback voltage VFB increases, the PWM controller 190 increases the frequency of the PWM signal. If the feedback voltage VFB decreases, the PWM controller 190 decreases the frequency of the PWM signal. The PWM signal may correspond to a square wave.

As described above, the second converting module 150A may control the number of activated inverting converters for generating the second power voltage ELVSS according to the amount of the drive current ID. In other words, the second converting module 150A may operate only the first inverting converter 160 having low internal resistance (e.g., low current capability) when the drive current ID is less than or equal to the reference current. The second converting module 150A may operate the plurality of inverting converters 160 and 170 when the drive current ID is greater than the reference current, such that a current for generating the second power voltage ELVSS may be dividedly provided to the respective inverting converters 160 and 170. Thus, conduction loss and heat generation may be decreased, and output efficiency of the power voltage may be increased. Further, the PWM controller is commonly used for controlling the plurality of inverting converters, so that configuration of the DC-DC converter may be simplified.

Figure 3A:
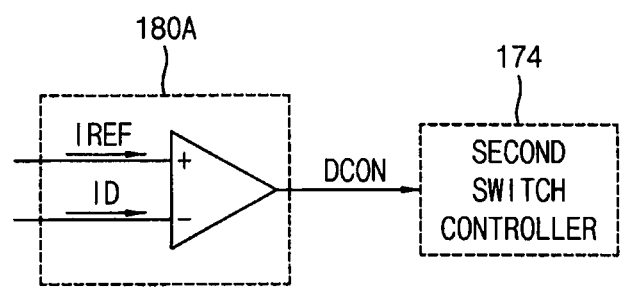
FIG. 3A illustrates an example of a drive controller included in the second converting module shown in FIG. 2.

FIG. 3A illustrates an example of a drive controller included in the second converting module shown in FIG. 2.

Referring to FIGS. 2 and 3A, the drive controller 180A may include a comparator for outputting a driving control signal DCON.

The drive controller 180A may compare a drive current ID received from a sensor with a reference current IREF (e.g., a predetermined reference current), and may generate the driving control signal DCON according to the comparison result. The reference current IREF may correspond to the current capability (or the current tolerance) of the first inverting converter 160.

The drive controller 180A may enable the driving control signal DCON when the drive current ID is greater than the reference current IREF. The drive controller 180A may disable the driving control signal DCON when the drive current ID is less than or equal to the reference current IREF. The driving control signal DCON generated from the drive controller 180A may be provided to the second switch controller 174 in the second inverting converter 170.

In some embodiments, an enable level of the driving control signal DCON may correspond to a logic high level, and a disable level of the driving control signal DCON may correspond to a logic low level. In some embodiments, the enable level of the driving control signal DCON may correspond to a logic low level, and the disable level of the driving control signal DCON may correspond to a logic high level.

In some embodiments, the second switch controller 174 may operate (or be activated) during the enable period of the driving control signal DCON. The second switch controller 174 may be deactivated during the disable period of the driving control signal DCON.

Figure 3B:
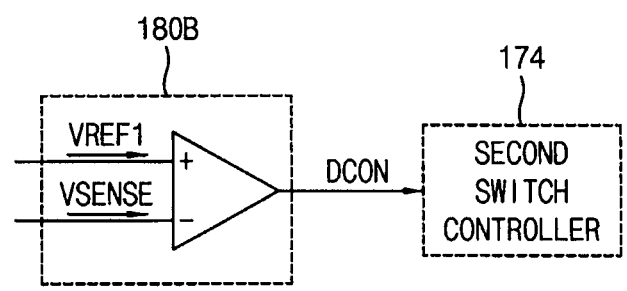
FIG. 3B illustrates another example of a drive controller included in the second converting module shown in FIG. 2.

FIG. 3B illustrates another example of a drive controller included in the second converting module shown in FIG. 2.

Referring to FIGS. 2 and 3B, the drive controller 180B may include a comparator for outputting a driving control signal DCON.

The drive controller 180B may compare a detected voltage Vsense received from a sensor with a reference voltage VREF1 (e.g., a predetermined reference voltage), and may generate the driving control signal DCON according to the comparison result. The reference voltage VREF1 may correspond to a voltage converted from the current capability (or the current tolerance) of the first inverting converter 160.

The drive controller 180B may enable the driving control signal DCON when the detected voltage Vsense is greater than the reference voltage VREF1. The drive controller 180B may disable the driving control signal DCON when the detected voltage Vsense is less than or equal to the reference voltage VREF1. The driving control signal DCON generated from the drive controller 180B may be provided to the second switch controller 174 in the second inverting converter 170.

Figure 4A:
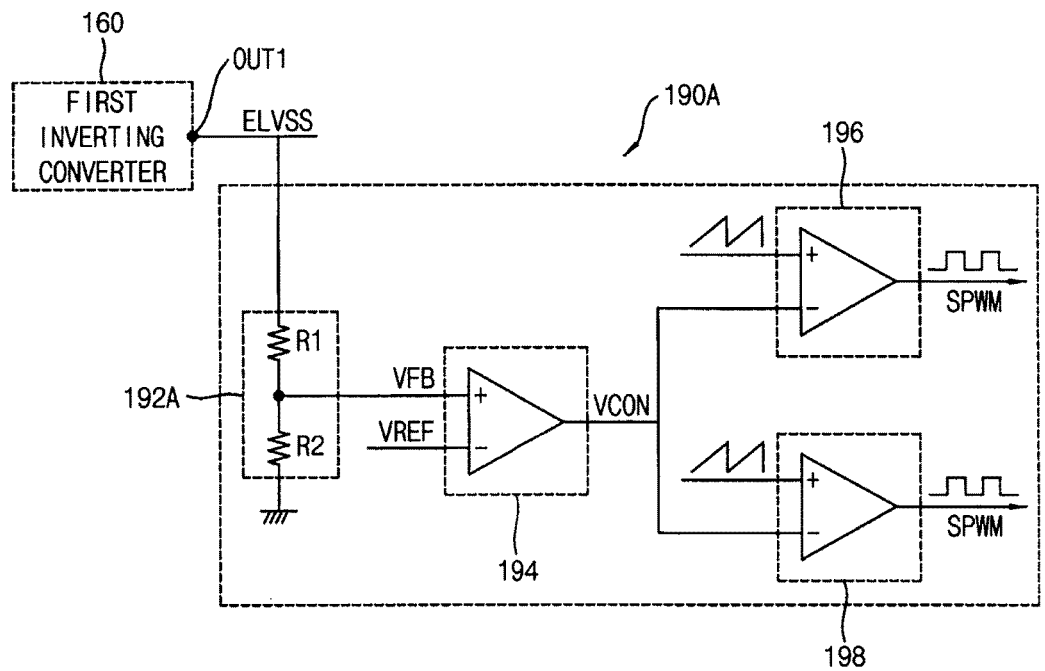
FIG. 4A illustrates an example of a PWM controller included in the second converting module shown in FIG. 2.
Figure 4B:
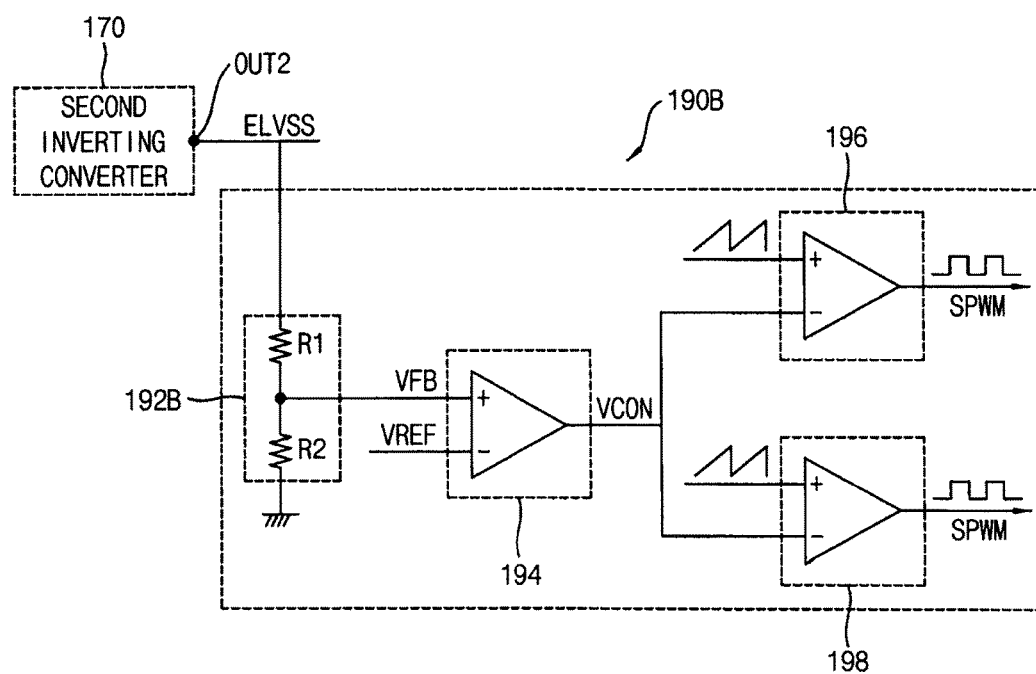
FIG. 4B illustrates another example of a PWM controller included in the second converting module of FIG. 2.

FIG. 4A illustrates an example of a PWM controller included in the second converting module shown in FIG. 2. FIG. 4B illustrates another example of a PWM controller included in the second converting module shown in FIG. 2.

Referring to FIGS. 2, 4A and 4B, the PWM controller 190A and 190B may include a voltage divider 192A and 192B, an amplifier 194, a first PWM signal generator 196, and a second PWM signal generator 198. In some embodiments, the PWM controller 190A may include first through Nth PWM signal generators according to the number of inverting converters, where N is an integer greater than 2.

As illustrated in FIG. 4A, the PWM controller 190A may generate a control voltage VCON based on a voltage difference between a feedback voltage VFB generated based on the second power voltage ELVSS and a reference voltage VREF (e.g., a predetermined reference voltage), and may generate a PWM signal SPWM based on the control voltage VCON. The PWM signal SPWM may be provided to the first and second switch controllers 164 and 174.

The voltage divider 192A may be connected to one of the first and second inverting converters 160 and 170. The voltage divider 192A may generate the feedback voltage VFB by dividing the second power voltage ELVSS. In some embodiments, the voltage divider 192A may include a plurality of resistors R1 and R2 that are connected to an output terminal OUT1 of the first inverting converter 160. The voltage divider 192A may generate the feedback voltage VFB by dividing the second power voltage ELVSS, which is generated in the first inverting converter 160.

The voltage divider 192A is arranged at one of the first and second inverting converters 160 and 170, so that configuration of the second converting module 150 may be simplified.

The amplifier 194 may output the control voltage VCON by amplifying the voltage difference between the feedback voltage VFB and the reference voltage VREF. A level of the control voltage VCON may be adjusted according to the voltage difference between the feedback voltage VFB and the reference voltage VREF. Pulse width (or a frequency) of the PWM signal SPWM may be determined based on the level of the control voltage VCON. Thus, although the drive current ID changes, the control voltage VCON is adjusted such that the second power voltage ELVSS may have stable voltage level.

The first PWM signal generator 196 may generate the PWM signal SPWM based on the control voltage VCON, and may output the PWM signal SPWM to the first inverting converter 160. The second PWM signal generator 198 may generate the PWM signal SPWM based on the control voltage VCON, and may output the PWM signal SPWM to the second inverting converter 170.

In some embodiments, the first and second PWM signal generators 196 and 198 may have substantially the same circuit configurations. For example, the first PWM signal generator 196 may receive the control voltage VCON and a saw-tooth wave, may compare the control signal VCON and the saw-tooth wave, and may output the PWM signal SPWM having a square wave form based on the comparison result. The pulse width of the PWM signal SPWM may be determined based on the level of the control voltage VCON. Since the second PWM signal generator 198 may operate substantially the same as the operation of the first PWM signal generator 196, duplicated descriptions will not be repeated.

As illustrated in FIG. 4B, the voltage divider 192B may include a plurality of resistors R1 and R2 that are connected to an output terminal OUT2 of the second inverting converter 170. The voltage divider 192B may generate the feedback voltage VFB by dividing the second power voltage ELVSS, which is generated in the second inverting converter 170.

The voltage divider 192B is arranged at one of the first and second inverting converters 160 and 170, so that configuration of the second converting module 150 may be simplified. Further, a single PWM controller 190A and 190B controls the first and second inverting converters 160 and 170, so that configuration of the second converting module 150 may be simplified.

Figure 5:
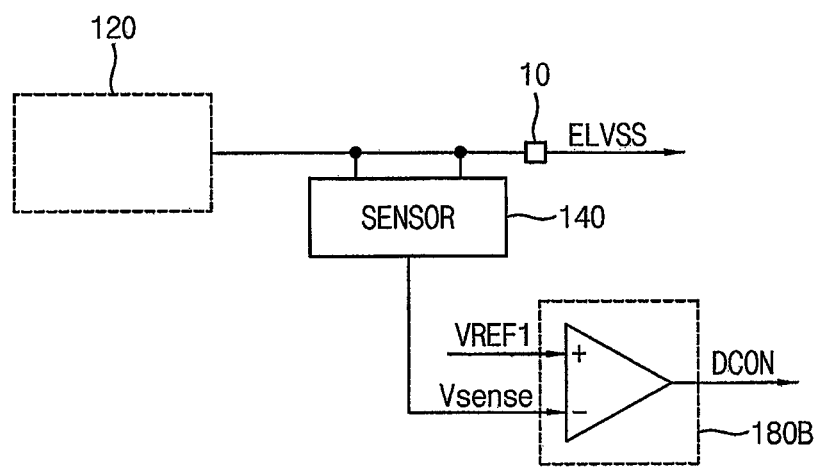
FIG. 5 illustrates an example of a sensor and a drive controller included in the DC-DC converter shown in FIG. 1.

FIG. 5 illustrates an example of a sensor and a drive controller included in the DC-DC converter shown in FIG. 1.

Referring to FIGS. 1 and 5, the DC-DC converter 100 may include the sensor 140 and the drive controller 180B.

The sensor 140 may be connected between the first converting module 120 and the first output terminal 10. The sensor 140 may output a detected voltage Vsense to the drive controller 180B based on the drive current ID. In some embodiments, the sensor 140 may include an extra resistance to detect the drive current ID.

The drive controller 180B may compare the detected voltage Vsense with a reference voltage VREF1 (e.g., a predetermined reference voltage), so as to generate a driving control signal DCON for controlling an operation of the second inverting converter. The drive controller 180B may enable the driving control signal DCON when the detected voltage Vsense is greater than the reference voltage VREF1. The drive controller 180B may disable the driving control signal DCON when the detected voltage Vsense is less than or equal to the reference voltage VREF1.

Figure 6:
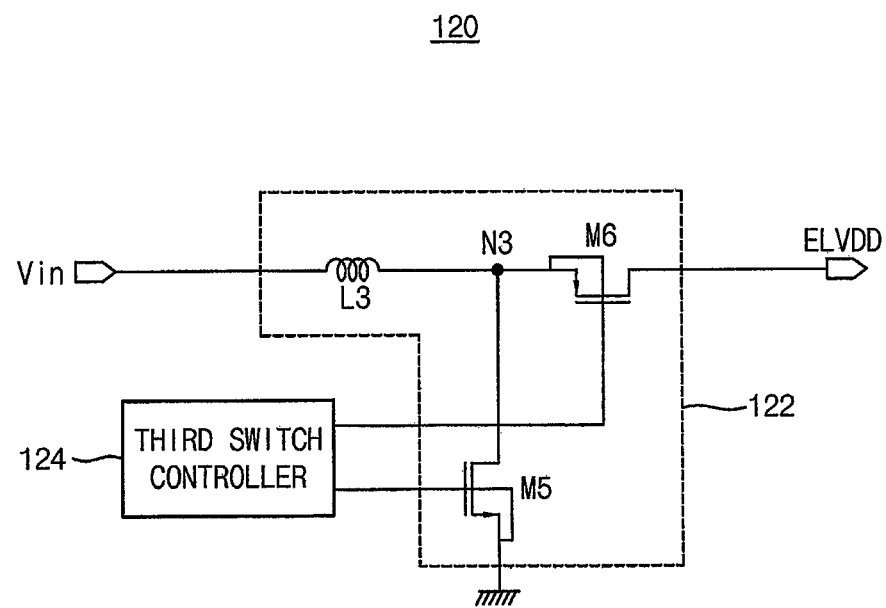
FIG. 6 illustrates an example of a first converting module included in the DC-DC converter shown in FIG. 1.

FIG. 6 illustrates an example of a first converting module included in the DC-DC converter shown in FIG. 1.

Referring to FIGS. 1 and 6, the first converting module 120 may include a third switch part 122 (e.g., a third switch circuit) and a third switch controller 124.

The first converting module 120 may convert an input power voltage Vin to a first power voltage ELVDD in response to a control signal, and may output the first power voltage ELVDD to a first output terminal 10.

In some embodiments, the third switch part 122 may include a fifth switch transistor M5, a sixth switch transistor M6, and a third inductor L3.

The third inductor L3 may be connected between an input terminal for receiving the input power voltage Vin and a third node N3. The third inductor L3 may generate an electric motive force, based on an increase/decrease of an input current according to the input power voltage Vin.

The fifth switch transistor M5 may be connected between the third node N3 and a ground. The fifth switch transistor M5 may be turned on by receiving the control signal from the third switch controller 124, and may control current to flow through the third inductor L3.

The sixth switch transistor M6 may be connected between the third node N3 and an output terminal for outputting the first power voltage ELVDD. The fifth and sixth switch transistors M5 and M6 may be alternately turned on or off. After the fifth switch transistor M5 is turned on, and an electric motive force is generated by the third inductor L3, the sixth switch transistor M6 is turned on to convert the input power voltage Vin into the first power voltage ELVDD. The first power voltage ELVDD may be output to the output terminal.

The third switch controller 124 may control the on-off operations of the fifth and sixth switch transistors M5 and M6. The fifth and sixth switch transistors M5 and M6 may be alternately turned on/off by the third switch controller 124.

Figure 7:
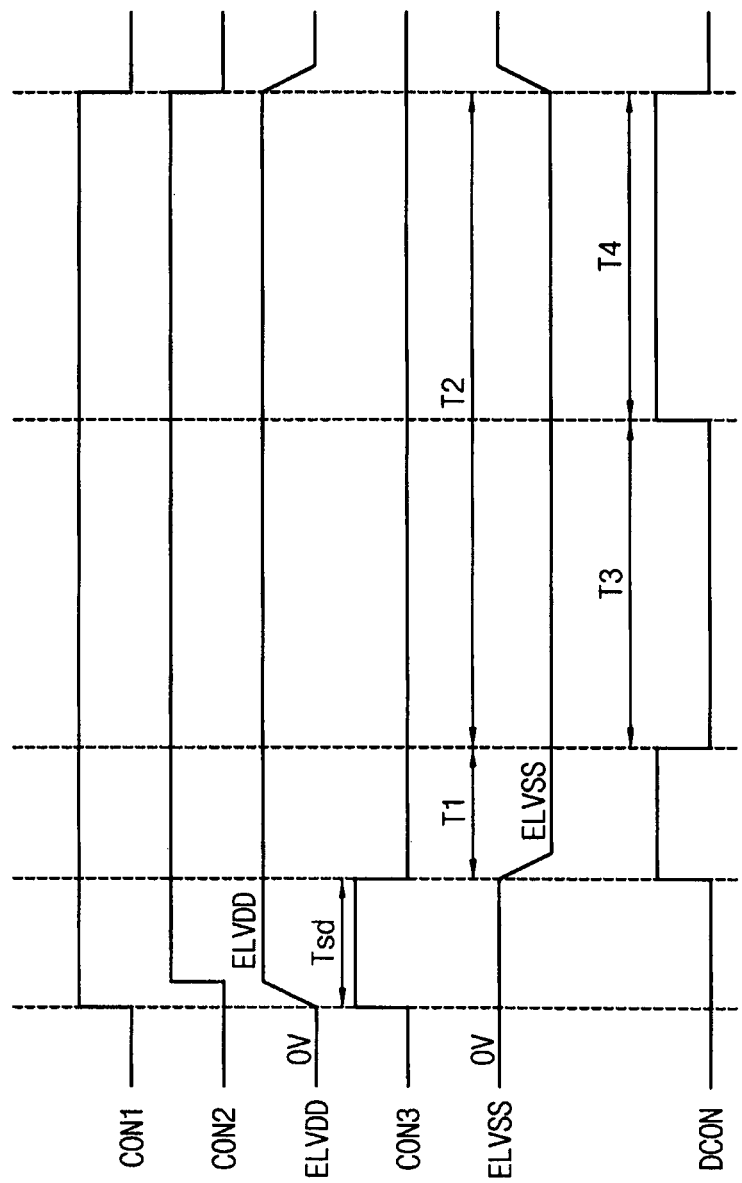
FIG. 7 is a timing diagram illustrating an example of an operation of the DC-DC converter shown in FIG. 1.

FIG. 7 is a timing diagram illustrating an example of an operation of the DC-DC converter shown in FIG. 1.

Referring to FIGS. 1 and 7, the sensor 140 may detect the drive current ID when the first power voltage ELVDD is output. The first and second inverting converters 160 and 170 may concurrently (e.g., simultaneously) generate the second power voltage ELVSS during a start-up period T1.

The first converting module 120 may output the first power voltage ELVDD based on a first control signal CON1, and the first inverting converter 160 in the second inverting module 150 may output the second power voltage ELVSS based on the first control signal CON1 when the first control signal CON1 applied from an external device is enabled. In some embodiments, the DC-DC converter 100 may sequentially output the first and second power voltages ELVDD and ELVSS having an interval (e.g., a predetermined interval). For example, the second converting module 150 (e.g., the first inverting converter 160) may output the second power voltage ELVSS after a certain delay period Tsd from a point in time at which the first power voltage ELVDD is output. An enable period of a third control signal CON3 may correspond to the delay period Tsd. The DC-DC converter 100 may enable the third control signal CON3 during the delay period Tsd, and disable the third control signal CON3 after the delay period Tsd. The third control signal CON3 may control a length of the delay period Tsd. The first inverting converter 160 may output the second power voltage ELVSS based on the first and third control signals CON1 and CON3 when the third control signal CON3 is disabled. The delay period Tsd may be a short detection period during which the DC-DC converter 100 detects short line fault at the first output terminal 10 and/or the second output terminal 20.

The sensor 140 may receive the enabled second control signal CON2 when the first power voltage ELVDD is output to the first output terminal 10. The sensor 140 may detect the drive current ID, or a detected voltage converted from the drive current ID, in response to the enabled second control signal CON2. In some embodiments, the sensor 140 may periodically detect the drive current ID in response to the second control signal CON2, while the first converting module 120 outputs the first power voltage ELVDD.

In some embodiments, a period during which the first inverting converter 160 generates (or outputs) the second power voltage ELVSS may include the start-up period T1 and a valid image period T2. Display data (or image data) representing a black color image may be provided to a display panel during the start-up period T1. The display data representing a valid image may be provided to the display panel during the valid image period T2.

In some embodiments, the drive controller 180 may enable the driving control signal DCON during the start-up period T1. Thus, the second inverting converter 170 may generate the second power voltage ELVSS with the first inverting converter 160 during the start-up period T1. As a result, the drive controller 180 may enable the driving control signal DCON regardless of an amount of the drive current ID during the start-up period T1. Therefore, the second converting module 150 may output the second power voltage ELVSS in response to the amount of the drive current ID at a start time of the valid image period T2.

The drive controller 180 may enable the driving control signal DCON when the drive current ID is greater than the reference current.

As illustrated in FIG. 7, the drive current ID that is less than or equal to the reference current is detected by the sensor 140 within a first period T3, such that the drive controller 180 may disable the driving control signal DCON. Thus, the second inverting converter 170 does not operate (or does not generate the second power voltage ELVSS) during the first period T3.

The drive current ID that is greater than the reference current is detected by the sensor 140 within a second period T4, such that the drive controller 180 may enable the driving control signal DCON. Thus, the second inverting converter 170 generates the second power voltage ELVSS during the second period T4.

However, these are examples, and the enable/disable periods of the driving control signal DCON may exist within the valid image period T2 according to the amount of the drive current ID.

Figure 8:
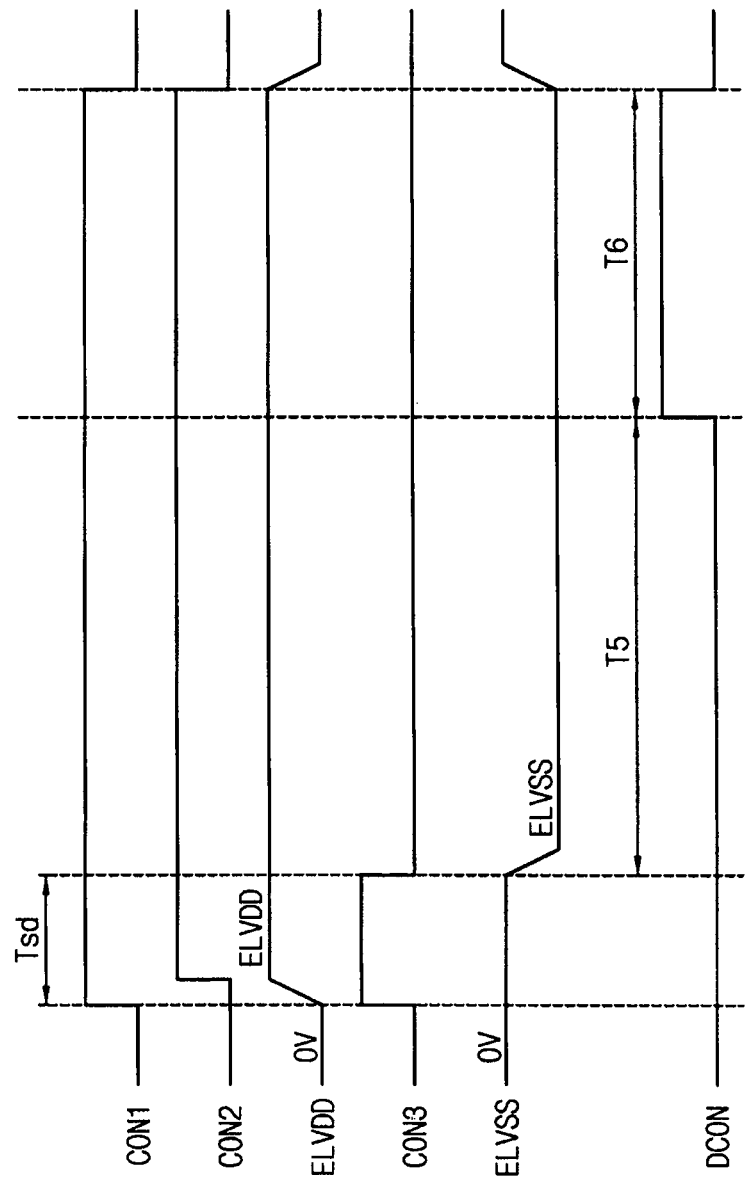
FIG. 8 is a timing diagram illustrating another example of an operation of the DC-DC converter shown in FIG. 1.

FIG. 8 is a timing diagram illustrating another example of an operation of the DC-DC converter shown in FIG. 1.

Referring to FIGS. 1, 7, and 8, the sensor 140 may detect the drive current ID when the first power voltage ELVDD is output. The second inverting converter 170 may generate the second power voltage ELVSS based on a comparison result between the drive current ID and the reference current.

The first converting module 120 may output the first power voltage ELVDD, and the first inverting converter 160 in the second converting module 150 may output the second power voltage ELVSS when the first control signal CON1 applied from an external device is enabled. In some embodiments, the second converting module 150 (e.g., the first inverting converter 160) may output the second power voltage ELVSS after a certain delay period Tsd from a point in time at which the first power voltage ELVDD is output.

The sensor 140 may receive the enabled second control signal CON2 when the first power voltage ELVDD is output to the first output terminal 10. The sensor 140 may detect the drive current ID, or a detected voltage converted from the drive current ID, in response to the enabled second control signal CON2.

The drive controller 180 may enable the driving control signal DCON when the drive current ID is greater than the reference current. In other words, the drive controller 180 may enable the driving control signal DCON regardless of the start-up period T1. The drive controller 180 may enable the driving control signal DCON based on only the comparison result between the drive current ID and the reference current. In this case, the second inverting converter 170 does not operate in the start-up period T1 when the drive current is less than the reference current, so that power consumption in the start-up period T1 may be reduced.

As illustrated in FIG. 8, the drive current ID that is less than or equal to the reference current is detected by the sensor 140 during the first period T5 such that the drive controller 180 may disable the driving control signal DCON. Thus, the second inverting converter 170 does not operate (or does not generate the second power voltage ELVSS) during the first period T5.

The drive current ID that is greater than the reference current is detected by the sensor 140 during a second period T6 such that the drive controller 180 may enable the driving control signal DCON. Thus, the second inverting converter 170 generates the second power voltage ELVSS during the second period T6.

Figure 9:
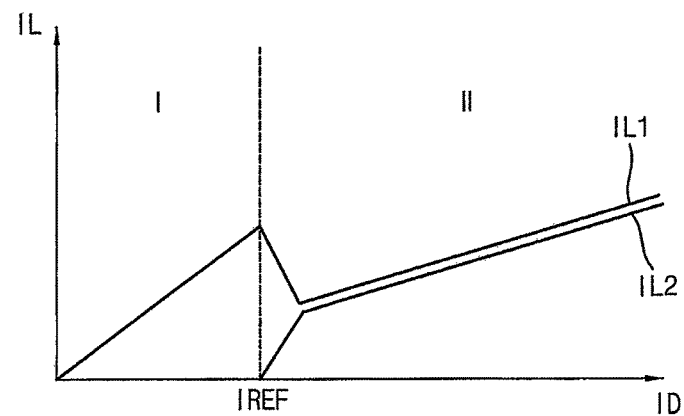
FIG. 9 is a graph illustrating an example of a current change flowing through a second converting module of the DC-DC converter shown in FIG. 1.

FIG. 9 is a graph illustrating an example of a current change flowing through a second converting module of the DC-DC converter shown in FIG. 1.

Referring to FIGS. 1 and 9, a current IL flowing through the second converting module may change according to the drive current ID.

The first inverting converter 160 generates the second power voltage ELVSS, and the second inverting converter 170 does not generate the second power voltage ELVSS when the drive current ID is less than or equal to the reference current IREF (e.g., represented as section I in FIG. 9). Thus, a first inductor current IL1 may flow through an inductor included in the first inverting converter 160, but a second inductor current IL2 flowing through an inductor in the second inverting converter 170 may not be generated. The first inverting converter 160 is designed to operate corresponding to small drive current ID such that resistances of the elements in the first inverting converter 160 may be decreased, and output efficiency of the second converting module may be improved. In addition, conduction loss and power consumption of the DC-DC converter 100 due to the element, such as switch transistors and inductors, in the first inverting converter 160 may be reduced.

The first and second inverting converters 160 and 170 may concurrently (e.g., simultaneously) generate the second power voltage ELVSS when the drive current ID is greater than the reference current IREF (e.g., represented as section II in FIG. 9). Thus, the drive current ID may be divided into the first inductor current IL1 and the second inductor current IL2, and the first and second inductor currents IL1 and IL2 may be provided to the second converting module 150. Thus, total conduction loss and total power consumption may decrease as the drive current is divided, when high drive current ID is generated to display an image.

Figure 10:
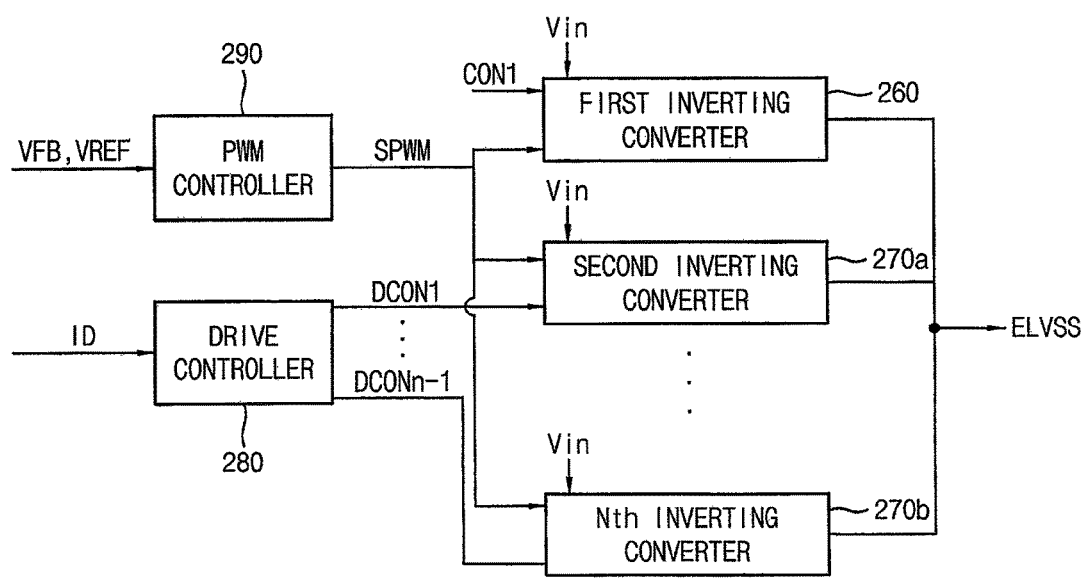
FIG. 10 is a block diagram illustrating another example of a second converting module included in the DC-DC converter shown in FIG. 1.

FIG. 10 is a block diagram illustrating another example of a second converting module included in the DC-DC converter shown in FIG. 1.

Referring to FIG. 10, the second converting module 250 may include first through Nth inverting converters 260 through 270b, where N is an integer greater than 2, a drive controller 280, and a PWM controller 290. In some embodiments, the first through Nth inverting converters 260 through 270b may include buck-boost converters, respectively.

The first inverting converter 260 may include a first switch part (e.g., a first switch circuit) and a first switch controller. The first switch part may include a plurality of switch transistors and an inductor. The plurality of switch transistors may be alternately turned on and off, so as to convert an input power voltage Vin to a second power voltage ELVSS. The first inverting converter 260 may generate the second power voltage ELVSS based on a first control signal CON1 received from an external source. The first switch controller may receive a PWM signal SPWM from the PWM controller 290, and may control the on-off operation of the switch transistors based on the PWM signal SPWM.

Each of the second through Nth inverting converters 270a through 270b may include a switch part (e.g., a switch circuit) and a switch controller. Since the second through Nth inverting converters 270a through 270b and the first inverting converter 260 may have substantially the same circuit configurations, duplicated descriptions will not be repeated.

In some embodiments, current capabilities of the first through Nth inverting converters 260 and 270a through 270b may be substantially the same. For example, sizes (e.g., aspect ratios) of respective ones of the switch transistors in the first through Nth inverting converters 260 and 270a through 270b may be substantially the same, and inductances of inductors in the first through Nth inverting converters 260 and 270a through 270b may be substantially the same.

In some embodiments, the current capabilities of the first through Nth inverting converters 260 and 270a through 270b may be different from each other. For example, the size of the switch transistors and the inductance of the inductor in the first inverting converter 260 may be the smallest from among the elements in the first through Nth inverting converters 260 and 270a through 270b.

The second through Nth inverting converters 270a through 270b may be controlled according to an amount of the drive current ID.

The drive controller 280 may compare the drive current ID with a plurality of reference currents (e.g., a plurality of predetermined reference currents), so as to generate first through Nth driving control signals DCON1 through DCONn−1 for controlling operations of the second through Nth inverting converters 270a through 270b, respectively. The drive controller 280 may include a plurality of comparators each comparing the drive current ID with the respective reference currents to output first through Nth driving control signals DCON1 through DCONn−1, respectively. The operation of the drive controller 280 is substantially the same as the drive controller explained with reference to FIGS. 1 through 3B. Thus, any repetitive explanation concerning the operations will be omitted.

The PWM controller 290 may generate a control voltage based on a voltage difference between a feedback voltage VFB generated based on the second power voltage ELVSS and a reference voltage VREF (e.g., a predetermined reference voltage), and may generate a PWM signal SPWM based on the control voltage. The PWM signal SPWM may be applied to the first through Nth switch controllers. The PWM controller 290 may include a voltage divider, an amplifier, and first through Nth PWM signal generators.

The voltage divider may be connected to one of the first through Nth inverting converters 260 and 270a through 270b. The voltage divider may generate the feedback voltage VFB by dividing the second power voltage ELVSS. The voltage divider is arranged at one of the first through Nth inverting converters 260 and 270a through 270b, so that configuration of the second converting module 250 may be simplified.

The amplifier may output the control voltage VCON by amplifying the voltage difference between the feedback voltage VFB and the reference voltage VREF. The first through Nth PWM signal generators may respectively generate the PWM signal SPWM, and respectively output the PWM signal SPWM to the first through Nth inverting converters 260 and 270a through 270b.

Figure 11:
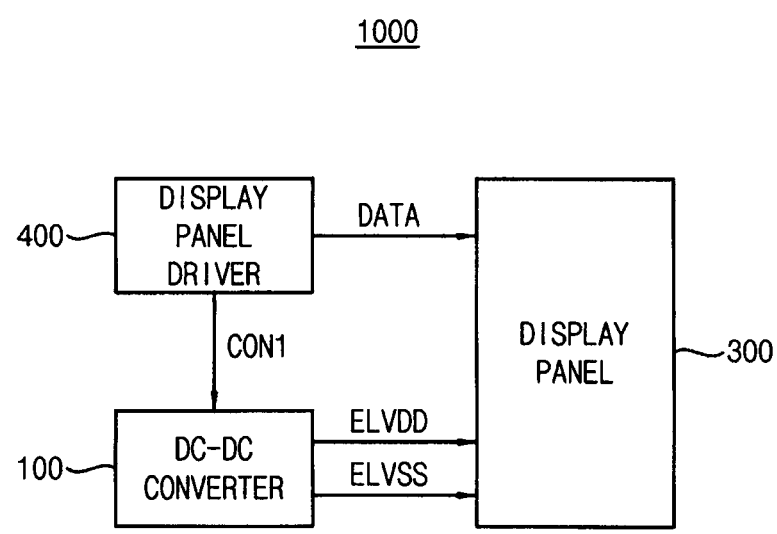
FIG. 11 is a block diagram of a display device according to some example embodiments.

FIG. 11 is a block diagram of a display device according to some example embodiments.

Referring to FIGS. 1 and 11, the display device 1000 includes a display panel 300, the DC-DC converter 100, and a display panel driver 400.

The display panel 300 may include a plurality of pixels, each receiving a first power voltage ELVDD, a second power voltage ELVSS lower than the first power voltage ELVDD, and a data signal DATA to display an image. In some embodiments, the first power voltage ELVDD is a positive voltage and the second power voltage ELVSS is a negative voltage.

The DC-DC converter 100 may supply the display panel 300 with the first and second power voltages ELVDD and ELVSS in response to a control signal CON1, and may detect a drive current that is provided to the display panel 300. The DC-DC converter 100 may include a plurality of inverting converters for generating the second power voltage ELVSS. The DC-DC converter may activate a first inverting converter from among the inverting converters regardless of an amount of the detected drive current, and may selectively activate a second inverting converter from among the inverting converters according to the amount of the drive current. In some embodiments, the DC-DC converter 100 may include a first converting module 120 (e.g., a first converter) configured to convert an input power voltage to the first power voltage ELVDD in response to the control signal CON1, and to output the first power voltage ELVDD to a first output terminal. In some embodiments, the DC-DC converter 100 may further include a sensor 140 configured to detect the drive current when the first power voltage ELVDD is output, and a second converting module 150 (e.g., a second converter) configured to convert the input power voltage Vin into a second power voltage ELVSS lower than the first power voltage ELVDD in response to the first control signal CON1, and to output the second power voltage ELVSS to a second output terminal. The amount of the drive current may be proportional to light emitting luminance of the display panel 300.

The second converting module 160 may include a first inverting converter configured to convert the input power voltage into the second power voltage ELVSS based on the control signal CON1, a second inverting converter configured to convert the input power voltage into the second power voltage ELVSS in response to the first control signal CON1 and to output the second power voltage ELVSS to a second output terminal, and a drive controller configured to compare the drive current with a reference current (e.g., a predetermined reference current) to generate a driving control signal for controlling an operation of the second inverting converter, and to output the driving control signal to the second inverting converter. Structures and operations of the DC-DC converter 100 are described above with reference to FIGS. 1 through 11, and thus, duplicated descriptions thereof will not be repeated.

The display panel driver 400 may provide the data signal DATA to the display panel 300 to drive the display panel 300, and may provide the control signal CON1 to the DC-DC converter 100 to drive the DC-DC converter 100.

The display device 1000 may be implemented using various kinds of display panels, in so far as the display panel 300 displays an image using at least two power voltages ELVDD and ELVSS received from the DC-DC converter 100. For example, the display device 1000 may include an organic light emitting display device. In this case, each of the plurality of pixels included in the display panel 300 includes an organic light emitting diode (OLED).

Hereinafter, an organic light emitting display device including the DC-DC converter 100 according to some example embodiments will be described.

Figure 12:
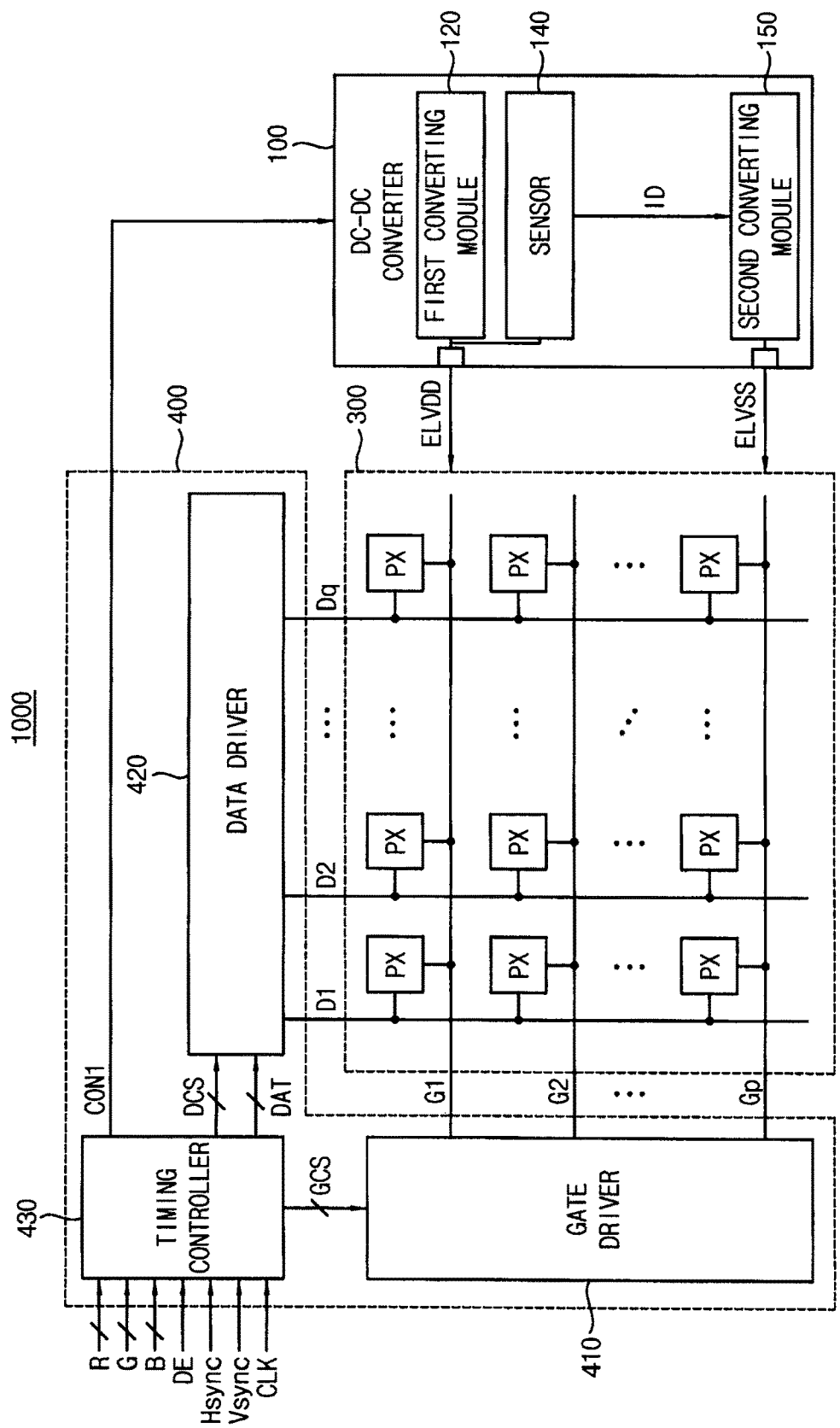
FIG. 12 is a block diagram illustrating an example of a display device shown in FIG. 11.

FIG. 12 is a block diagram illustrating an example of a display device shown in FIG. 11.

Referring to FIG. 12, the display device 1000 may include a display panel 300, a DC-DC converter 100, and a display panel driver 400.

The display panel 300 may include a plurality of pixels PX arranged in a matrix form. The plurality of pixels PX may be connected to a plurality of gate lines G1, G2, . . . , Gp and to a plurality of data lines D1, D2, . . . , Dq, where p and q are positive integers. Each of the plurality of pixels PX may operate in response to a first power voltage ELVDD, a second power voltage ELVSS, a gate signal, and a data signal. In some embodiments, the second power voltage ELVSS may be less than the first power voltage ELVDD. For example, the first power voltage ELVDD may be a positive voltage and the second power voltage ELVSS may be a negative voltage.

The display panel driver 400 may include a gate driver 410, a data driver 420, and a timing controller 430.

The timing controller 430 may receive RGB image signals R, G, and B, a vertical synchronization signal Vsync, a horizontal synchronization signal Hsync, a main clock signal CLK, and a data enable signal DE from an external graphic controller, and may generate an output image signal DAT, a data control signal DCS, a gate control signal GCS, and a first control signal CON1. The timing controller 430 may provide the gate control signal GCS to the gate driver 410, the output image signal DAT and the data control signal DCS to the data driver 420, and the first control signal CON1 to the DC-DC converter 100. For example, the gate control signal GCS may include a vertical synchronization start signal, which controls a start of outputting the gate signal, a gate clock signal, which controls an output timing of the gate signal, and an output enable signal, which controls a duration of the gate signal. The data control signal DCS may include a horizontal synchronization start signal, which controls a start of outputting the data signal DATA, a data clock signal, which controls an output timing of the data signal DATA, and a load signal. The first control signal CON1 may include a start signal, which controls a start of outputting the power voltages ELVDD and ELVSS.

The gate driver 410 may consecutively (e.g., sequentially) apply the gate signal to the gate lines G1, G2, . . . , Gp in response to the gate control signal GCS.

The data driver 420 may apply the data signal DATA to the data lines D1, D2, . . . , Dq in response to the data control signal DCS and the output image signal DAT.

The DC-DC converter 100 may include a first converting module 120 (e.g., a first converter) for converting an input power voltage to the first power voltage ELVDD, a sensor 140 for detecting a drive current ID when the first power voltage ELVDD is provided to the display panel 300, and a second converting module 160 (e.g., a second converter) for converting the input voltage to the second power voltage ELVSS.

For example, the second converting module 160 may include a first inverting converter configured to generate the second power voltage based on the input power voltage regardless of the amount of the detected drive current ID, a second inverting converter configured to generate the second power voltage ELVSS based on the input power voltage according to the amount of the detected drive current ID, and a drive controller configured to compare the drive current ID with a reference current (e.g., a predetermined reference current) to generate a driving control signal for controlling an operation of the second inverting converter, and to output the driving control signal to the second inverting converter.

A period in which the DC-DC converter 100 generates the second power voltage ELVSS may include a start-up period and a valid image period. In this case, the display panel driver 400 may provide the data signal representing a black color image to the display panel 300 during the start-up period, and may provide the data signal representing a valid image to the display panel 300 during the valid image period.

In some embodiments, the second inverting converter may generate the second power voltage ELVSS when the drive current is greater than the reference current. In this case, the second inverting converter may operate only within the valid image period.

In some embodiments, the second inverting converter may generate the second power voltage ELVSS during the start-up period. For example, the drive controller may enable the driving control signal regardless of an amount of the drive current ID during the start-up period Structures and operations of the DC-DC converter 100 are described above with reference to FIGS. 1 through 11, and thus, duplicated descriptions thereof will not be repeated.

Figure 13:
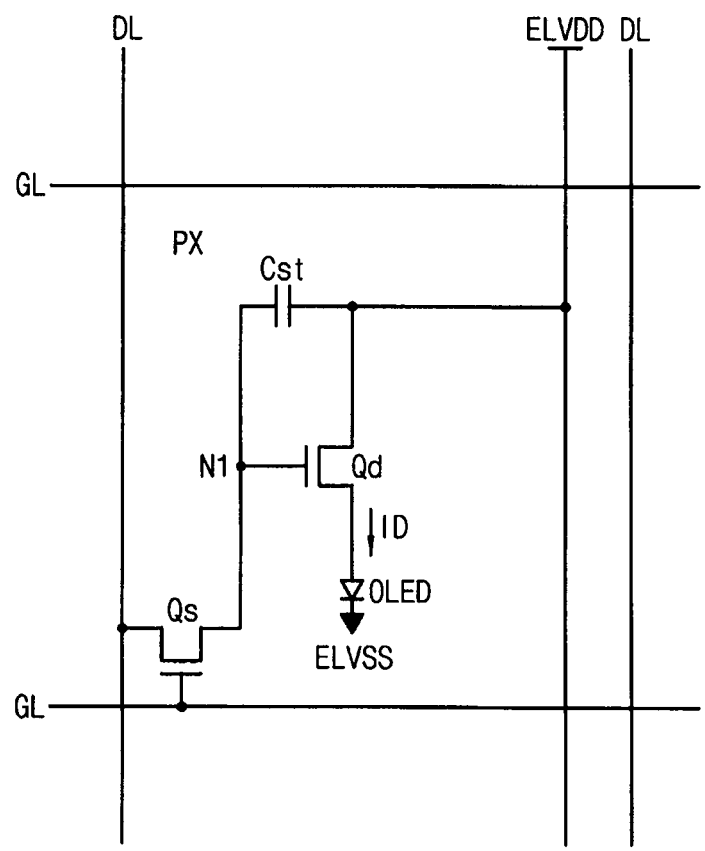
FIG. 13 is a circuit diagram illustrating an example of a pixel included in the display device shown in FIG. 11.

FIG. 13 is a circuit diagram illustrating an example of a pixel included in the display device shown in FIG. 11.

Referring to FIG. 13, each of the plurality of pixels PX may include an organic light emitting diode (OLED), a driving transistor Qd, a switching transistor Qs, and a storage capacitor Cst.

The switching transistor Qs may be turned on in response to a gate signal received through a gate line GL to provide the data signal DATA received through a data line DL to a first node N1. The storage capacitor Cst may store the data signal DATA provided from the switching transistor Qs. The driving transistor Qd may be turned on in response to a voltage provided from the switching transistor Qs and/or the storage capacitor Cst to flow a drive current ID corresponding to a magnitude of the data signal DATA. The drive current ID may flow from the first power voltage ELVDD to the second power voltage ELVSS through the driving transistor Qd and the organic light emitting diode (OLED). An intensity of light emitted from the organic light emitting diode (OLED) may be determined by an intensity of the drive current ID.

As described above, the display device 1000 including the DC-DC converter 100 according to some example embodiments may drive the first inverting converter having small internal resistance (e.g., having small current capability) to generate the second power voltage ELVSS when the drive current ID is less than or equal to the reference current. The DC-DC converter 100 may distribute the drive current to the plurality of inverting converters to generate the second power voltage ELVSS when the drive current ID is greater than the reference current, such that the inverting converters may respectively generate the second power voltage ELVSS. Thus, power consumption with the conduction loss may be reduced, and conversion efficiency of the power voltage may be improved. Further, a heat issue of the display device 1000 may be improved.

Figure 14:
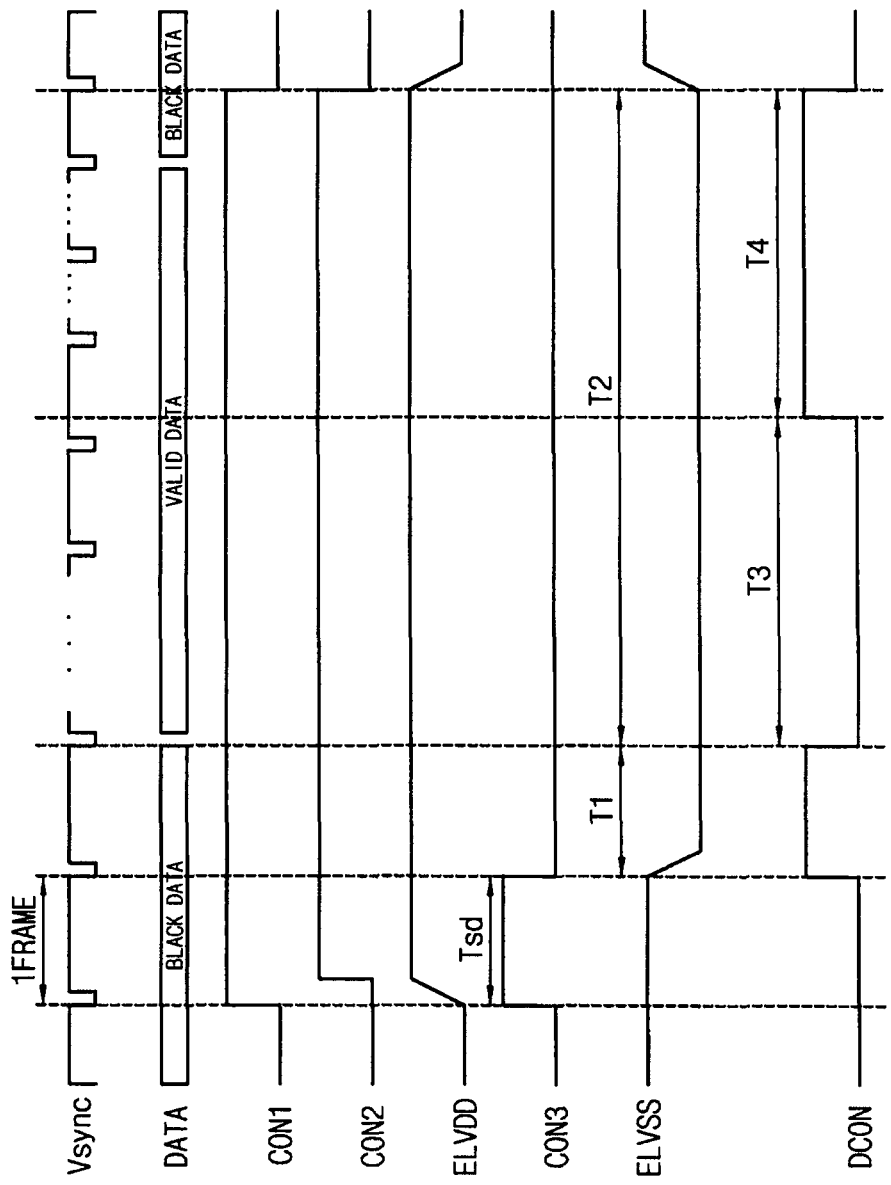
FIG. 14 is a timing diagram illustrating an example of an operation of the display device shown in FIG. 12.

FIG. 14 is a timing diagram illustrating an example of an operation of the display device shown in FIG. 12.

Referring to FIGS. 1 to 14, the sensor 140 included in the DC-DC converter 100 may detect the drive current ID when the first power voltage ELVDD is output. The first and second inverting converters 160 and 170 may concurrently (e.g., simultaneously) generate the second power voltage ELVSS during a start-up period T1.

The display panel driver 400 may provide the first control signal CON1 to the DC-DC converter 100 in synchronization with the vertical synchronization signal Vsync, while the display panel driver 400 provides the data signal DATA corresponding to black color BLACK DATA to the display panel 300. In some embodiments, the first control signal CON1 may be provided to the first converting module 120 and the first inverting converter 160 of the second converting module 150.

In some embodiments, the display panel driver 400 may provide the enabled second control signal CON2 when the first power voltage ELVDD is provided to the display panel 300. The sensor 140 may periodically detect the drive current ID in response to the second control signal CON2, while the first converting module 120 outputs the first power voltage ELVDD.

The DC-DC converter 100 may sequentially output the first and second power voltages ELVDD and ELVSS having an interval (e.g., a predetermined interval). In some embodiments, the second converting module 150 (e.g., the first inverting converter 160) may output the second power voltage ELVSS after a certain delay period Tsd from a point in time at which the first power voltage ELVDD is output. An enable period of a third control signal CON3 may correspond to the delay period Tsd. The DC-DC converter 100 may enable the third control signal CON3 during the delay period Tsd, and may disable the third control signal CON3 after the delay period Tsd. The third control signal CON3 may control a length of the delay period Tsd. The first inverting converter 160 may output the second power voltage ELVSS based on the first and third control signals CON1 and CON3 when the third control signal CON3 is disabled. The delay period Tsd may be a short detection period during which the DC-DC converter 100 detects short line faults at output terminals of the DC-DC converter 100.

In some embodiments, a period during which the DC-DC converter 100 generates (or outputs) the second power voltage ELVSS may include the start-up period T1 and a valid image period T2. In this case, the display panel driver 400 may provide the data signal DATA representing the black color image BLACK DATA to the display panel 300 during the start-up period T1, and may provide the data signal DATA representing a valid image VALID DATA to the display panel 300 during the valid image period T2. In some embodiments, the start-up period T1 may correspond to N frame cycles, where N is a positive integer.

In some embodiments, the drive controller 180 included in the second converting module 150 may enable the driving control signal DCON during the start-up period T1. Thus, the second inverting converter 170 may generate the second power voltage ELVSS with the first inverting converter 160 during the start-up period T1. As a result, the drive controller 180 may enable the driving control signal DCON regardless of an amount of the drive current ID during the start-up period T1. Therefore, the second converting module 150 may output the second power voltage ELVSS in response to the amount of the drive current ID at a start time of the valid image period T2.

The drive controller 180 may enable the driving control signal DCON when the drive current ID is greater than the reference current.

As illustrated in FIG. 14, the drive current ID that is less than or equal to the reference current is detected by the sensor 140 within a first period T3, such that the drive controller 180 may disable the driving control signal DCON. Thus, the second inverting converter 170 does not operate (or does not generate the second power voltage ELVSS) during the first period T3. The drive current ID that is greater than the reference current is detected by the sensor 140 within a second period T4, such that the drive controller 180 may enable the driving control signal DCON. Thus, the second inverting converter 170 generates the second power voltage ELVSS during the second period T4.

Figure 15:
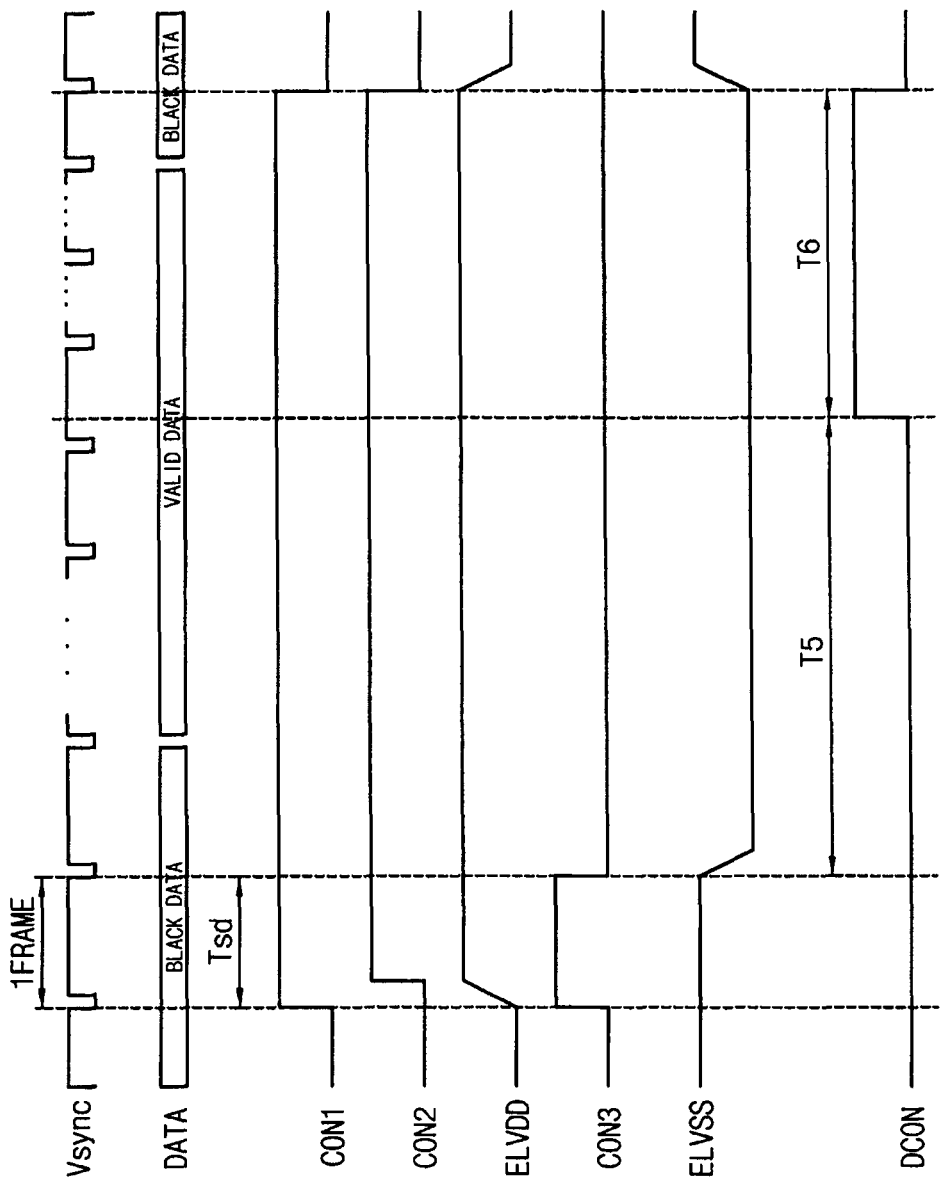
FIG. 15 is a timing diagram illustrating another example of an operation of the display device shown in FIG. 12.

FIG. 15 is a timing diagram illustrating another example of an operation of the display device shown in FIG. 12.

Referring to FIGS. 1 to 15, the sensor 140 included in the DC-DC converter 100 may detect the drive current ID when the first power voltage ELVDD is output. The second inverting converter 170 may generate the second power voltage ELVSS based on a comparison result between the drive current ID and the reference current.

The display panel driver 400 may provide the first control signal CON1 to the DC-DC converter 100 in synchronization with the vertical synchronization signal Vsync, while the display panel driver 400 provides the data signal DATA corresponding to black color BLACK DATA to the display panel 300. In some embodiments, the first control signal CON1 may be provided to the first converting module 120 and the first inverting converter 160 of the second converting module 150.

The drive controller 180 may enable the driving control signal DCON when the drive current ID is greater than the reference current. In other words, the drive controller 180 may enable the driving control signal DCON regardless of the start-up period T1. The drive controller 180 may enable the driving control signal DCON based on only the comparison result between the drive current ID and the reference current. In this case, the second inverting converter 170 does not operate in the start-up period T1 when the drive current is less than the reference current, so that power consumption in the start-up period T1 may be reduced.

As illustrated in FIG. 15, the drive current ID that is less than or equal to the reference current is detected by the sensor 140 during the first period T5, such that the drive controller 180 may disable the driving control signal DCON. Thus, the second inverting converter 170 does not operate (or does not generate the second power voltage ELVSS) during the first period T5. The drive current ID that is greater than the reference current is detected by the sensor 140 during a second period T6, such that the drive controller 180 may enable the driving control signal DCON. Thus, the second inverting converter 170 generates the second power voltage ELVSS during the second period T6.

Figure 16:
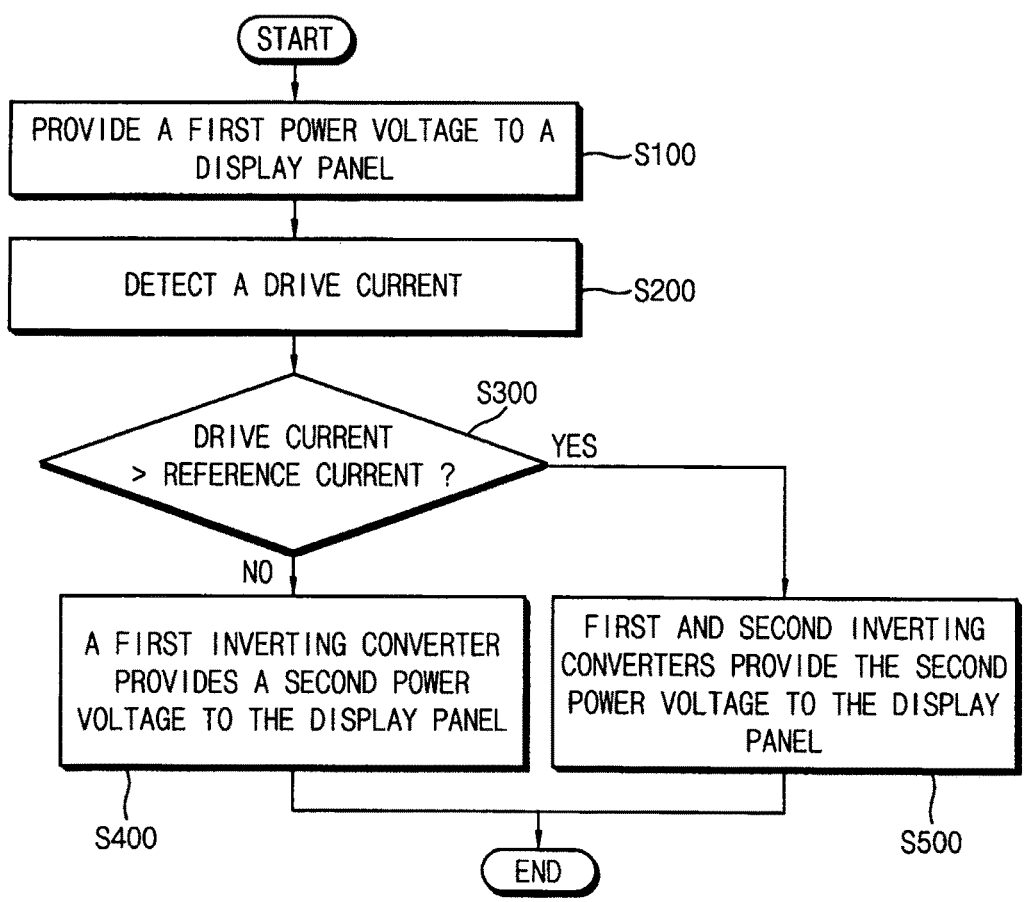
FIG. 16 is a flowchart of a method of driving a display device according to some example embodiments.

FIG. 16 is a flowchart of a method of driving a display device according to some example embodiments.

Hereinafter, a method of driving the display device 1000 shown in FIG. 12 will be described with reference to FIGS. 1 to 16.

Referring to FIGS. 1 to 16, the DC-DC converter 100 may provide the first power voltage ELVDD to the display panel 300 S100, detect the drive current ID, which is provided to the display panel 300, while the first power voltage is provided to the display panel 300 S200, and compare the drive current ID with the reference current IREF (e.g., the predetermined reference current) S300. The second power voltage ELVSS is provided to the display panel 300 by the first inverting converter 160 S400, when the drive current ID is less than or equal to the reference current IREF, such that the display device 100 displays a valid image on the display panel 300. Otherwise, the second power voltage ELVSS is provided to the display panel 300 by the first and second inverting converters 160 and 170 S500, when the drive current ID is greater than the reference current IREF, such that the display device 100 displays a valid image on the display panel 300.

The DC-DC converter 100 may provide the first power voltage ELVDD to the display panel 300 SI 00. In some embodiments, the first converting module 120 included in the DC-DC converter 100 may convert the input power voltage Vin into the first power voltage ELVDD.

The DC-DC converter 100 may detect the drive current ID while the first power voltage is provided to the display panel 300 S200. In some embodiments, the DC-DC converter 100 may include the sensor 140 for detecting the drive current ID. The sensor 140 may be arranged between the first converting module 120 and the output terminal at which the first power voltage ELVDD is output.

The DC-DC converter 100 may compare the amount of the drive current ID with the reference current IREF S300. In some embodiments, the reference current IREF may correspond to a maximum value of current capability of the first inverting converter 160.

The first inverting converter 160 may provide the second power voltage ELVSS to the display panel 300 when the drive current ID is less than or equal to the reference current IREF. Thus, power consumption due to generation of the second power voltage ELVSS may be reduced when a small drive current ID (e.g., less than the reference current) is provided to the display panel 300.

The first and second inverting converters 160 and 170 may concurrently (e.g., simultaneously) provide the second power voltage ELVSS to the display panel 300 when the drive current ID is greater than the reference current IREF. Thus, the distributed drive current ID may be respectively provided to the first and second inverting converters 160 and 170 when a large drive current ID (e.g., greater than the reference current) is provided to the display panel 300, so that power consumption with conduction loss may be reduced.

Figure 17:
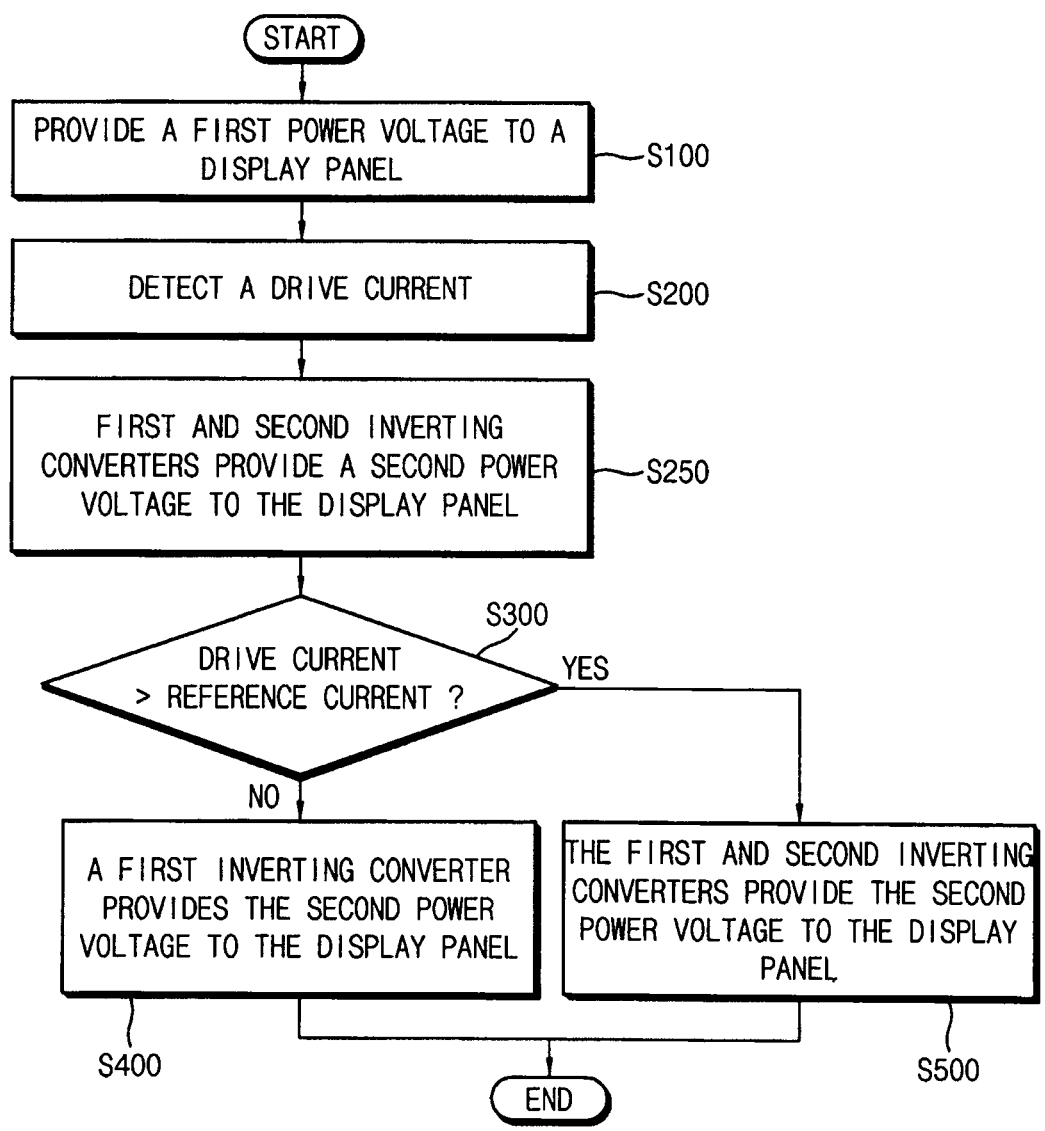
FIG. 17 is a flowchart illustrating an example of the method of driving the display device shown in FIG. 16.

FIG. 17 is a flowchart illustrating an example of the method of driving the display device shown in FIG. 16.

Referring to FIGS. 1 to 17, the method of driving the display device 1000 according to FIG. 17 has the same or substantially the same steps as the method of driving the display device 1000 according to FIG. 16, except that the first and second inverting converters 160 and 170 may provide the second power voltage ELVSS to the display panel 300 during the start-up period S250 in FIG. 17, before the DC-DC converter 100 compares the amount of the drive current ID with the reference current IREF S300.

In some embodiments, the start-up period T1 may be a period in which the display panel 400 provides the data signal DATA representing the black color image BLACK DATA to the display panel 300. The start-up period T1 may correspond to N frame cycles, where N is a positive integer. As a result, the drive controller 180 may enable the driving control signal DCON regardless of an amount of the drive current ID during the start-up period T1. Therefore, the second converting module 150 may output the second power voltage ELVSS in response to the amount of the drive current ID at a start time of the valid image period T2.

Structures and operations of the DC-DC converter 100 and the display device 1000 having the same are described above with reference to FIGS. 1 through 15, and thus, duplicated descriptions will not be repeated.

As described above, the method of driving the display device 100 according to some example embodiments may control the inverting converters in the second converting module based on an amount of the drive current, so that conversion efficiency of the power voltage may be improved, and power consumption with the conduction loss may be reduced. Thus, a heat issue of the display device may be improved.

Figure 18:
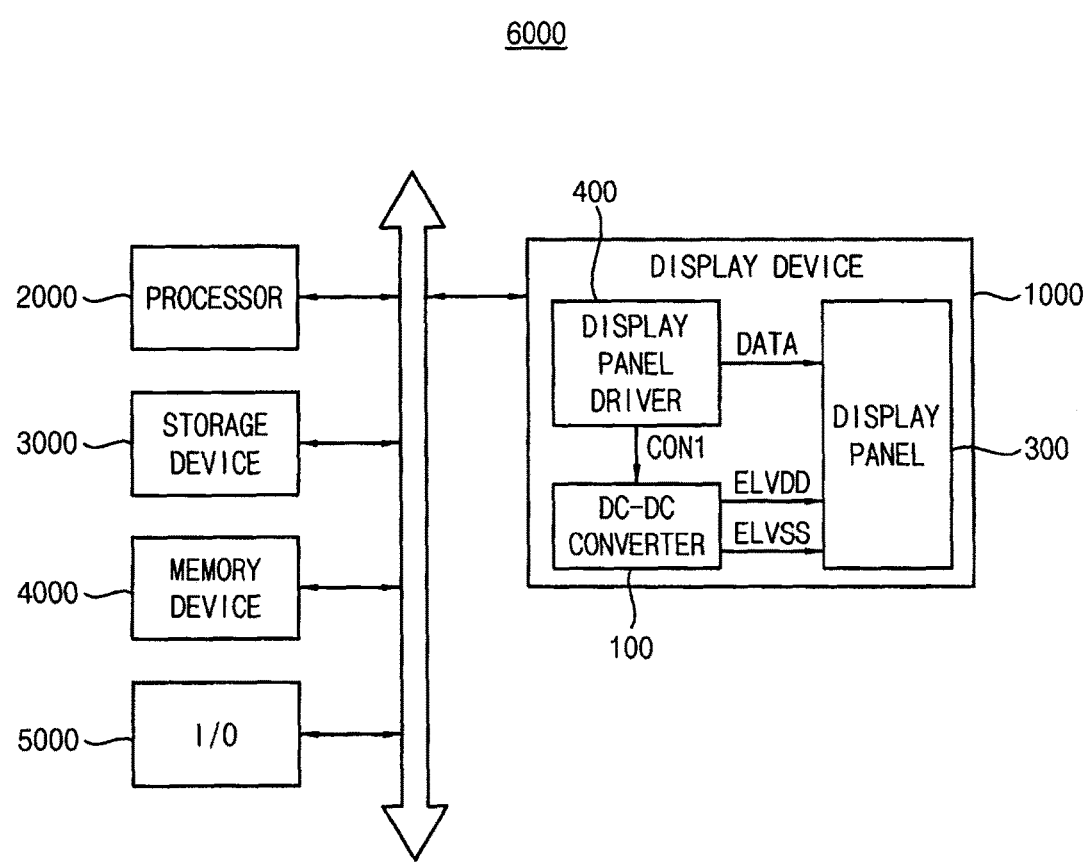
FIG. 18 is a block diagram of a system according to some example embodiments.

FIG. 18 is a block diagram of a system according to some example embodiments.

Referring to FIG. 18, the system 6000 may include the display device 1000, a processor 2000, a storage device 3000, a memory device 4000, and an I/O device 5000.

The storage device 3000 may store image data. The storage device 3000 may include a solid state drive (SSD), a hard disk drive (HDD), a CD-ROM, etc.

The display device 1000 may display the image data stored in the storage device 3000. The display device 1000 may include the display panel 300, the DC-DC converter 100, and the display panel driver 400. The display panel 300 may include a plurality of pixels that receive the first power voltage ELVDD, the second power voltage ELVSS lower than the first power voltage ELVDD, and the data signal DATA to display an image. The DC-DC converter 100 may provide the first and second power voltages ELVDD and ELVSS to the display panel 300 based on a control signal CON1. The DC-DC converter 100 may detect the drive current provided to the display panel 300, and may control generation of the second power voltage ELVSS based on an amount of the drive current. The DC-DC converter 100 may include a first converting module (e.g., a first converter) for converting an input power voltage into the first power voltage ELVDD, a sensor for detecting a drive current ID when the first power voltage ELVDD is provided to the display panel 300, and a second converting module (e.g., a second converter) for converting the input voltage into the second power voltage ELVSS. The display panel driver 400 may provide the data signal DATA to the display panel 300 to drive the display panel 300, and may provide the control signal CON1 to the DC-DC converter 100 to drive the DC-DC converter 100.

The display device 1000 may be implemented using various kinds of display panels in so far as the display panel 300 displays an image using at least two power voltages ELVDD and ELVSS received from the DC-DC converter 100. For example, the display device 1000 may include an organic light emitting display device. In this case, each of the plurality of pixels included in the display panel 300 includes an organic light emitting diode (OLED).

The display device 1000 may have the same or substantially the same structure as that of the display device 1000 shown in FIG. 12. A structure and an operation of the display device 1000 shown in FIG. 12 have been described above with reference to FIGS. 1 to 17. Thus, a detailed description of the display device 1000 included in the system 6000 will not be repeated.

The processor 2000 may control the storage device 3000 and the display device 1000. The processor 2000 may perform specific calculations, computing functions for various tasks, etc. The processor 2000 may include, e.g., a microprocessor or central processing unit (CPU). The processor 2000 may be coupled to the storage device 3000 and the display device 1000 via an address bus, a control bus, and/or a data bus. In addition, the processor 2000 may be coupled to an extended bus, such as a peripheral component interconnection (PCI) bus.

As discussed above, the system may include the memory device 4000 and the I/O device 5000. In some example embodiments, the system 6000 may further include a plurality of ports that communicate with a video card, a sound card, a memory card, a universal serial bus (USB) device, other electric devices, etc.

The memory device 4000 may store data for operations of the system 6000. For example, the memory device 4000 may include at least one volatile memory device, such as a dynamic random access memory (DRAM) device, a static random access memory (SRAM) device, etc., and/or at least one non-volatile memory device, such as an erasable programmable read-only memory (EPROM) device, an electrically erasable programmable read-only memory (EEPROM) device, a flash memory device, etc.

The I/O device 5000 may include one or more input devices (e.g., a keyboard, keypad, a mouse, a touch pad, a haptic device, etc.), and/or one or more output devices (e.g., a printer, a speaker, etc.). In some example embodiments, the display device 1000 may be included in the I/O device 5000.

The system 6000 may include any of several types of electronic devices, such as a digital television, a cellular phone, a smart phone, a personal digital assistant (PDA), a personal media player (PMP), a portable game console, a computer monitor, a digital camera, an MP3 player, etc.

As described above, some example embodiments relate to a display device including the DC-DC converter, and a system including the display device. The DC-DC converter 100 compares the drive current with the reference current. The DC-DC converter 100 may output the second power voltage ELVSS using a single inverting converter when the drive current is less than or equal to the reference current. The DC-DC converter 100 may output the second power voltage ELVSS using at least two inverting converters when the drive current is greater than the reference current. Therefore, conversion efficiency of the power voltage may be improved, and power consumption with the conduction loss may be reduced. Thus, a heat issue of the display device and the system may be improved.

The present embodiments may be applied to any suitable display device and any suitable system including the display device. For example, the present embodiments may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, etc.

The foregoing is illustrative of example embodiments, and is not to be construed as limiting thereof. Although some example embodiments have been described, those skilled in the art will readily appreciate that various modifications are possible in the example embodiments, without materially departing from the spirit and scope of the present invention. Accordingly, all such modifications are intended to be included within the spirit and scope of the present invention as defined in the claims, and their equivalents. In the claims, means-plus-function clauses, if any, are intended to cover the structures described herein as performing the recited function, and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the spirit and scope of the appended claims and their equivalents. Accordingly, the inventive concept is defined by the following claims, with equivalents of the claims to be included therein.

What is claimed is:

1. A DC-DC converter configured to supply a display panel with first and second power voltages, the DC-DC converter comprising:
    a first converting module comprising a first switch circuit and a first switch controller and configured to convert an input power voltage into the first power voltage in response to a control signal, and to output the first power voltage to a first output terminal;
    a sensor configured to detect a drive current of the display panel when the first power voltage is output; and
    a second converting module comprising a second switch circuit and a second switch controller and configured to convert the input power voltage into the second power voltage that is lower than the first power voltage in response to the control signal, and to output the second power voltage to a second output terminal, the second converting module comprising:
        a first inverting converter configured to generate the second power voltage corresponding to the input power voltage regardless of an amount of the detected drive current;
        a second inverting converter configured to generate the second power voltage corresponding to the input power voltage and according to the amount of the detected drive current only when a driving control signal is enabled; and
        a drive controller configured to compare the drive current with a reference current to generate the driving control signal for controlling an operation of the second inverting converter, and to output the driving control signal to the second inverting converter, the driving control signal being enabled when the drive current is greater than the reference current.

2. The DC-DC converter of claim 1, wherein the second converting module further comprises:
a pulse width modulation (PWM) controller configured to generate a control voltage based on a voltage difference between a feedback voltage generated based on the second power voltage and a reference voltage, and to generate a PWM signal based on the control voltage.

3. The DC-DC converter of claim 2, wherein the PWM controller comprises:
a voltage divider coupled to one of the first and second inverting converters, and configured to generate the feedback voltage by dividing the second power voltage;
an amplifier configured to output the control voltage by amplifying the voltage difference;
a first PWM signal generator configured to generate the PWM signal based on the control voltage, and to output the PWM signal to the first inverting converter; and
a second PWM signal generator configured to generate the PWM signal based on the control voltage, and to output the PWM signal to the second inverting converter.

4. The DC-DC converter of claim 3,
wherein the first switch circuit comprises:
a first switch transistor coupled between an input terminal configured to receive the input power voltage and a first node;
a second switch transistor coupled between the first node and the second output terminal; and
a first inductor coupled between the first node and a ground,
wherein the first and the second switch transistors are configured to be alternately turned on to convert the input power voltage to the second power voltage; and
wherein the first switch controller is configured to receive the PWM signal from the PWM controller, and to control an on/off operation of the first and the second switch transistors based on the PWM signal.

5. The DC-DC converter of claim 4,
wherein the second switch circuit comprises:
a third switch transistor coupled between the input terminal configured to receive the input power voltage and a second node;
a fourth switch transistor coupled between the second node and the second output terminal; and
a second inductor coupled between the second node and a ground,
wherein the third and the fourth switch transistors are configured to be alternately turned on to convert the input power voltage to the second power voltage; and
wherein the second switch controller is configured to receive the PWM signal from the PWM controller, to receive the driving control signal from the drive controller, and to control the on/off operation of the first and the second switch transistors based on the PWM signal and the driving control signal.

6. The DC-DC converter of claim 5, wherein aspect ratios of the first through fourth switch transistors are substantially the same, and an inductance of the first inductor is substantially the same as an inductance of the second inductor.

7. The DC-DC converter of claim 5, wherein aspect ratios of the first and the second switch transistors are less than aspect ratios of the third and the fourth switch transistors, and an inductance of the first inductor is less than an inductance of the second inductor.

8. The DC-DC converter of claim 1, wherein a period during which the first inverting converter generates the second power voltage comprises a start-up period and a valid image period, and the second inverting converter is configured to generate the second power voltage during the start-up period.

9. The DC-DC converter of claim 8, wherein the drive controller is further configured to enable DB the driving control signal for controlling an operation of the second inverting converter during the start-up period, and to enable the driving control signal when the drive current is greater than the reference current during the valid image period.

10. The DC-DC converter of claim 8, wherein the display panel is configured to receive display data representing a black color image during the start-up period, and
the display panel is configured to receive the display data representing a valid image during the valid image period.

11. The DC-DC converter of claim 1, wherein the sensor is coupled between the first converting module and the first output terminal, and
the sensor is configured to output a detected voltage by detecting the drive current.

12. The DC-DC converter of claim 11, wherein the drive controller is further configured to compare the detected voltage with a reference voltage to generate the driving control signal for controlling an operation of the second inverting converter, and to enable the driving control signal when the detected voltage is greater than the reference voltage.

13. A display device comprising:
a display panel comprising a plurality of pixels, each of the pixels being configured to receive a first power voltage, a second power voltage lower than the first power voltage, and a data signal to display an image;
a DC-DC converter configured to supply the display panel with the first and second power voltages in response to a control signal, and to detect a drive current applied to the display panel, the DC-DC converter comprising a plurality of inverting converters configured to generate the second power voltage, and the DC-DC converter further configured to activate a first inverting converter from among the inverting converters regardless of an amount of the detected drive current, and to activate a second inverting converter from among the inverting converters according to the amount of the drive current only when a driving control signal is enabled, the DC-DC converter comprising a drive controller configured to compare the drive current with a reference current to generate the driving control signal for controlling an operation of the second inverting converter, and to output the driving control signal to the second inverting converter, the driving control signal being enabled when the drive current is greater than the reference current; and
a display panel driver configured to provide the data signal to the display panel, and to provide the control signal to the DC-DC converter.

14. The display device of claim 13, wherein a period during which the DC-DC converter generates the second power voltage comprises a start-up period and a valid image period, and the start-up period corresponds to N frame cycles, where N is a positive integer.

15. The display device of claim 14, wherein the display panel driver is configured to provide the data signal representing a black color image to the display panel during the start-up period, and to provide the data signal representing a valid image during the valid image period.

16. The display device of claim 14, wherein the DC-DC converter further comprises:
- a first converting module comprising a first switch circuit and a first switch controller and configured to convert an input power voltage into the first power voltage in response to the control signal, and to output the first power voltage to a first output terminal;
- a sensor configured to detect the drive current when the first power voltage is output; and
- a second converting module comprising a second switch circuit and a second switch controller and configured to convert the input power voltage into the second power voltage in response to the control signal, and to output the second power voltage to a second output terminal, the second converting module comprising:
  - the first inverting converter configured to generate the second power voltage based on the input power voltage regardless of the amount of the detected drive current;
  - the second inverting converter configured to generate the second power voltage based on the input power voltage according to the amount of the detected drive current; and
  - the drive controller.

* * * * *